United States Patent [19]

Kamiya et al.

[11] Patent Number: 6,144,887
[45] Date of Patent: Nov. 7, 2000

[54] ELECTRONIC CONTROL UNIT WITH RESET BLOCKING DURING LOADING

[75] Inventors: Takamichi Kamiya, Kasugai; Takehiro Abeta, Anjo, both of Japan

[73] Assignee: Denso Corporation, Kariya, Japan

[21] Appl. No.: 08/987,062

[22] Filed: Dec. 8, 1997

[30] Foreign Application Priority Data

Dec. 9, 1996 [JP] Japan .................................. 8-328784
Dec. 18, 1996 [JP] Japan .................................. 8-338655

[51] Int. Cl.[7] ........................................................ G05B 9/02
[52] U.S. Cl. ................................ 700/79; 714/23; 700/2
[58] Field of Search .............................. 700/2, 79, 80; 714/14, 23, 22, 42, 49; 701/43, 114; 711/152, 163, 166; 365/228; 327/142

[56] References Cited

U.S. PATENT DOCUMENTS

| | | | |
|---|---|---|---|
| 5,271,474 | 12/1993 | Nishimoto et al. | 180/446 |
| 5,457,660 | 10/1995 | Ito | 365/228 |
| 5,576,650 | 11/1996 | Hirotani et al. | 327/142 |
| 5,835,706 | 11/1998 | Hikichi et al. | 714/49 |
| 5,964,888 | 10/1999 | Kosak et al. | 714/23 |

FOREIGN PATENT DOCUMENTS

| | | |
|---|---|---|
| 2-099746 | 4/1990 | Japan . |
| 7-119537 | 5/1995 | Japan . |
| 7-271634 | 10/1995 | Japan . |
| 7-311603 | 11/1995 | Japan . |

*Primary Examiner*—William Grant
*Assistant Examiner*—Steven R. Garland
*Attorney, Agent, or Firm*—Pillsbury Madison & Sutro LLP

[57] ABSTRACT

An electronic control unit has a microprocessor having a nonvolatile memory which is electrically reloadable. Data, with a predetermined loading voltage, is supplied as a condition. The microprocessor controls an object of control during normal operation by executing a control program made up of data stored in the nonvolatile memory. When a predetermined reloading condition has been established, the microprocessor carries out a loading process for loading load data, transmitted thereto from outside the nonvolatile memory, as an update. Along with executing the control program, a monitor signal is generated at predetermined time intervals indicating normal. A system monitoring circuit is also provided for monitoring the monitor signal outputted from the microprocessor. As such, when the monitor signal is not outputted within a predetermined time, a reset signal for resetting the microprocessor is sent to the microprocessor. A blocking circuit is provided for detecting whether the loading voltage is being supplied to the nonvolatile memory and preventing the microprocessor from being reset by the system monitoring circuit when the loading voltage is being supplied.

16 Claims, 16 Drawing Sheets

FIG. 17A (IGNITION SWITCH ON)
V_IG

K1 (K2)
MALFUNCTION

SA1 (SA2)
MALFUNCTION

SB1 (SB2)

SC
td

VPP1 (VPP2)

ELECTRONIC CONTROL UNIT WITH RESET BLOCKING DURING LOADING

CROSS-REFERENCE TO RELATED APPLICATION

This application is related to Japanese Patent Application Nos. Hei 8-328784 and Hei 8-338655, incorporated herein by reference.

BACKGROUND OF THE INVENTION

1. Field of the Invention

This invention relates to an electronic control unit having multiple microprocessors, and particularly to an electronic control unit where on-board loading of a control program and control data into each of the microprocessors is possible.

2. Description of Related Art

As disclosed for example in Japanese Patent Application Laid-Open No. Hei 2-99746, electronic control units for vehicles have been proposed which include a microprocessor having a nonvolatile memory such as an EEPROM or a flash EEPROM (hereinafter referred to as a flash memory) electrically reloadable with data and are constructed so that a control program and control data stored in this nonvolatile memory can be reloaded even after the electronic control unit is supplied to the market.

In an electronic control unit of this kind, during normal operation the microprocessor controls an object of control such as an engine by executing a control program made up of data stored in the nonvolatile memory. When the data (a control program and control data referred to in the execution of the control program) stored in the nonvolatile memory is to be reloaded, a separate memory loading unit is connected to the electronic control unit and the memory loading unit and the microprocessor are thereby connected by way of a communication line. Then, when predetermined reloading conditions are established, the microprocessor carries out a loading process wherein it receives load data (i.e., data constituting a new control program and new control data) transmitted to it from the memory loading unit and loads this load data into the nonvolatile memory as an update.

Therefore, with this kind of electronic control unit, because it becomes possible to carry out so-called on-board loading, in which a control program and control data are loaded into the nonvolatile memory of the microprocessor after the microprocessor has been mounted in the electronic control unit, even if it is necessary to change the content of the operation of the unit (the control content) after the unit is supplied to the market, this can be done easily.

Also, in the case of this kind of electronic control unit in which on-board loading is possible, in the process of manufacturing the unit it is possible to newly load a control program and control data into the nonvolatile memory of the microprocessor after the microprocessor is mounted in the unit.

However, in recent years, among electronic control units of this type, as their control content has become more complex, units having multiple microprocessors have become the norm, and there has been a need for this kind of electronic control unit to be constructed so that on-board loading is possible with respect to each of these multiple microprocessors.

Also, generally, in an electronic control unit having a microprocessor, to ensure safety of the control performed by the unit it is necessary to monitor whether or not the control program is being executed normally in the microprocessor and for the microprocessor to be reset (initialized) when an abnormality occurs.

In the case of an electronic control unit having multiple microprocessors, sometimes a specified microprocessor monitors the operation of another microprocessor (whether or not a control program is being executed normally by other than that microprocessor) and resets that other microprocessor when it detects a failure. If this kind of construction is employed, because it is not necessary to provide a hardware circuit such as a so-called a watchdog circuit for monitoring the microprocessor for each microprocessor, safety of control can be ensured with a simple unit construction.

However, when an electronic control unit in which on-board loading with respect to each of multiple microprocessors is possible as described above and also a specified microprocessor monitors the operation of another microprocessor, the following problem arises.

That is, in the process of manufacturing the electronic control unit, after the microprocessors are mounted, when first a control program and so on are newly loaded into a monitoring side microprocessor (hereinafter called the monitoring microprocessor) which is to monitor another microprocessor and then after that an attempt is made to newly load a control program and so on into a monitored side microprocessor (hereinafter called the monitored microprocessor), whereas the monitoring microprocessor executes the control program already loaded into it and performs its normal operation, the monitored microprocessor does not execute its normal control program and instead carries out a loading process, and consequently the monitored microprocessor is determined by the monitoring microprocessor to have suffered a failure. As a result, the monitored microprocessor performing the loading process (in other words in the process of loading a control program and so on) is reset by the operation of the monitoring microprocessor and it becomes impossible to carry out loading of the control program and so on with certainty.

Further, to satisfy the need for independent reloadability of multiple microprocessors by applying the related art disclosed in Japanese Laid-Open Patent Publication No. Hei 7-311603, it is conceivable to employ a method wherein for each microprocessor a communication circuit and a communication line for carrying out data communication between the microprocessor and external circuitry are provided and a memory loading unit is selectively connected exclusively to the communication circuit and the communication line corresponding to the microprocessor into which a control program and control data are to be reloaded.

However, when this kind of construction is used, data communication hardware such as a communication circuit must be provided for each microprocessor, and consequently the unit becomes large and its cost increases.

If, on the other hand, a construction is employed wherein all of the microprocessors mounted in the electronic control unit use a single communication line commonly to carry out data communication with external devices such as a memory loading unit, although less data communication hardware is required, when this kind of construction is adopted simply, the following problem arises.

That is, while reloading of data into the nonvolatile memory of any one microprocessor is being carried out, if another microprocessor transmits data to the communication line, the data being received by the microprocessor carrying out a loading process for data reloading is destroyed by the data transmitted from the other microprocessor and, as a result of this, incorrect data is loaded into the nonvolatile memory of the microprocessor that is the object of the data reloading.

SUMMARY OF THE INVENTION

It is therefore an object of the present invention to provide an electronic control unit in which one microprocessor monitors the operation of another microprocessor, and even when a control program is loaded into the monitoring microprocessor before a control program is loaded into the monitored microprocessor a control program can be loaded into the monitored microprocessor with certainty and thus both one microprocessor monitoring another microprocessor and the ability to carry out on-board loading of control programs into each of the microprocessors individually are realized with certainty at the same time.

An electronic control unit according to a first aspect of the present invention for achieving the above-mentioned object and other objects provided by the invention includes first and second microprocessors each having a nonvolatile memory electrically reloadable with data.

During normal operation, the first microprocessor controls an object of control by executing a first control program made up of data stored in its nonvolatile memory and the second microprocessor controls an object of control by executing a second control program made up of data stored in its nonvolatile memory. Also, as it executes the first control program, the first microprocessor monitors whether or not the second control program is being executed normally by the second microprocessor and when it determines that a failure has occurred in the execution of the second control program, resets the second microprocessor. In this way, without providing a hardware circuit dedicated to monitoring the operation of the second microprocessor, it is possible to avoid program runaway in the second microprocessor and ensure safety of control.

When a predetermined reloading condition is established, on the other hand, either of the two microprocessors can carry out a loading process for loading load data transmitted to it from outside into its nonvolatile memory as an update, and in this connection this first electronic control unit includes monitoring operation blocking means. This monitoring operation blocking means prevents the second microprocessor from being reset by the operation of the first microprocessor while the second microprocessor is carrying out the above-mentioned loading process.

As a result, in the process of manufacturing this electronic control unit, even when a loading order is employed wherein, after the microprocessors are installed, the constituent data of the first control program is newly loaded into the first microprocessor (specifically, into the nonvolatile memory thereof) first and then after that the constituent data of the second control program is newly loaded into the second microprocessor (specifically, into the nonvolatile memory thereof), which is the monitored side, whereby the second microprocessor in the process of carrying out a loading process being reset by the operation of the first microprocessor that is the monitoring side is prevented.

Therefore, with this electronic control unit of the invention, even when a control program (the first control program) is loaded into the first microprocessor that is the monitoring side before a control program is loaded into the second microprocessor that is the monitored side it is possible to load a control program (the second control program) into the second microprocessor that is the monitored side, with certainty and thus whatever the order in which the control programs are loaded into the two microprocessors, loading can be carried out with certainty. As a result, both one microprocessor monitoring another microprocessor and the ability to carry out on-board loading of control programs into each of the microprocessors individually can be realized with certainty at the same time.

If the above-mentioned nonvolatile memory electrically reloadable with data is, for example, an EEPROM or a flash memory, when newly loading or reloading data into the nonvolatile memory it is necessary for a predetermined loading voltage higher than a normal operating voltage to be supplied to the microprocessor.

In this connection, in this electronic control unit of this aspect of the present the invention, when the second microprocessor carries out the above-mentioned loading process with at least a predetermined loading voltage being supplied as a condition, as in a second electronic control unit provided by the invention the above-mentioned monitoring operation blocking means can be provided to detect whether or not the loading voltage is being supplied and, when the loading voltage is being supplied, prevent the second microprocessor from being reset by the operation of the first microprocessor.

With this electronic control unit, whether or not the second microprocessor is carrying out a loading process can be detected simply, without a special process or circuit being provided.

Also, if when determining that a failure has occurred in the execution of the second control program the first microprocessor outputs a reset signal to the second microprocessor, the above-mentioned monitoring operation blocking means can prevent the second microprocessor from being reset by preventing the reset signal outputted from the first microprocessor from being inputted into the storage medium.

When this is done, resetting of the second microprocessor by the operation of the first microprocessor when the second microprocessor is carrying out the above-mentioned loading process can be prevented with certainty.

As the monitoring operation blocking means in this case, a switching device or a logical circuit device for making breaking a signal line through which the reset signal is sent from the first microprocessor to the second microprocessor can be used, and a certain effect can thereby be obtained with a simple construction.

According to another aspect of the present invention, in addition to first and second microprocessors described above, there are provided system monitoring means and blocking means, and the first microprocessor, as it executes the first control program, outputs a monitor signal indicating that it is normal at predetermined intervals of and monitors whether or not the second control program in the nonvolatile memory of the second microprocessor is being executed normally by the second microprocessor, and when determining that a failure has occurred in the execution of this second control program stops outputting the monitor signal.

The system monitoring means monitors the monitor signal outputted from the first microprocessor, and when this monitor signal is not outputted within a time set longer than the above-mentioned predetermined time, outputs a reset signal to the both the first and second microprocessors.

Also, the blocking means prevents either of the two computers from being reset by the system monitoring means while either of the two microprocessors is carrying out the loading process.

With this electronic control unit, during normal operation, i.e., when neither of the two microprocessors is carrying out a loading process, not only when a failure occurs in the first microprocessor itself but also when a failure occurs in the second microprocessor and the first microprocessor detects that failure does the outputting by the first microprocessor of the above-mentioned monitor signal stop, and along with this a reset signal is outputted to both of the microprocessors from the system monitoring means. Thus, a failure occurring in either of the microprocessors during normal operation can be detected and resolved with a single system monitoring means only.

Furthermore, when either or both of the microprocessors is carrying out a loading process, the action of the blocking means prevents either of the microprocessors from being reset by the system monitoring means.

Therefore, with this fifth electronic control unit, whatever the order in which the control programs are loaded into the two microprocessors, that loading can be carried out with certainty, and furthermore it is possible to realize both monitoring of both of the microprocessors and the ability to carry out on-board loading of control programs into each of the microprocessors individually with an extremely simple construction.

In the electronic control unit according to this aspect of the invention, when the microprocessors are constructed to carry out the above-mentioned loading process with at least a predetermined loading voltage being supplied as a condition, the blocking means can detect whether or not the loading voltage is being supplied to either of the microprocessors and prevent either of the microprocessors from being reset by the system monitoring means when the loading voltage is being supplied to either of the microprocessors.

When this is done, the same effect as above, that is, the effect that it is possible to simply detect whether or not either of the microprocessors is carrying out a loading process without providing a special process or circuit, can be obtained.

Also, using the blocking means for preventing the reset signal outputted from the system monitoring means from being inputted into either of the microprocessors, it is possible to prevent either of the two microprocessors from being reset while it is carrying out a loading process.

If the system monitoring means is made up of a counter which performs a counting operation at intervals of a fixed period and has its count value initialized by the monitor signal outputted from the first microprocessor and reset signal outputting means for outputting the reset signal to both of the microprocessors when the count value of the counter reaches a predetermined value and the first microprocessor as it executes the first control program in its own nonvolatile memory outputs the monitor signal to the counter at intervals of a period shorter than the time taken for the count value of the counter to reach said predetermined value after being initialized, the blocking means can prevent either of the computers from being reset by forcibly stopping the counting operation of the counter.

That is, the system monitoring means is a so-called watchdog timer circuit, and the reset signal to the two microprocessors being outputted is prohibited by the counting operation of a watchdog timing counter of the watchdog timer circuit being stopped. With this electronic control unit, the two microprocessors being reset can be prevented with certainty by means of a simple construction.

It is also an object of the present invention to provide an electronic control unit with which it is possible with a simple construction and certainly to reload a control program and control data inside each of multiple microprocessors.

An electronic control unit according to this aspect of the present invention provided to achieve the above-mentioned object and other objects has multiple microprocessors each having a nonvolatile memory electrically reloadable with data and is constructed so that all of the microprocessors commonly use the same single communication line to conduct communication with the outside.

During normal operation each of the microprocessors executes a control program for controlling a predetermined object of control according to a control program and control data made up of data stored in the nonvolatile memory, whereby the control operation of the electronic control unit is carried out.

Also, each of the microprocessors, when a predetermined reloading condition is established, conducts a loading process for receiving load data transmitted thereto from external circuitry and loading it into its nonvolatile memory as an update. Thus, by the loading condition being established for one of the microprocessors at a time and load data constituting a new control program and control data being transmitted to the electronic control unit from external circuitry, the data inside the nonvolatile memory of each of the microprocessors can be reloaded one microprocessor at a time.

Here, the electronic control unit according to this aspect of the invention is provided with communication operation controlling means, and this communication operation controlling means, when any one of the microprocessors is executing the loading process, prohibits the other microprocessors from transmitting data to the communication line.

Consequently, when any one of the microprocessors is executing a loading process for reloading data, the other microprocessors are prohibited from transmitting data to the communication line, and as a result data received by the microprocessor that is the object of reloading being destroyed by data transmitted by another microprocessor is certainly prevented.

Therefore, with this electronic control unit, notwithstanding that all the microprocessors are using the same single communication line, the control program and control data stored in the nonvolatile memory of each of the microprocessors can be reloaded with certainty. Furthermore, because all the microprocessors use the same communication line, the control program and control data of each of the microprocessors can be reloaded without extra hardware for data communication such as communication circuits being provided.

The function of the above-mentioned communication operation controlling means can be realized by determining means provided in each of the microprocessors for determining whether or not another microprocessor is executing the loading process and transmission prohibiting means provided in each of the microprocessors together with the determining means for prohibiting data transmission from its microprocessor to the communication line when the determining means makes an affirmative determination.

That is, with the determining means each microprocessor determines whether or not another microprocessor is executing a loading process and when this determination is affirmative (in other words, when it is determined that another microprocessor is executing a loading process) prohibits its own data transmission to the communication line with the transmission prohibiting means and therefore when any one microprocessor is executing a loading process, the other microprocessors are prohibited from transmitting data to the communication line.

Because the function of the determining means and the transmission prohibiting means (and hence the function of the communication operation controlling means) can be realized by execution of a program in a microprocessor (so-called soft processing), the effects of the invention can be obtained without providing any special hardware.

Here, if each of the microprocessors includes identification information storing means for storing identification information concerning the microprocessor and when identification information transmitted from external circuitry matches the identification information stored in the identification information storing means, deems that the reloading condition has been established and executes the loading process, the determining means provided in each of the microprocessors need only compare the identification information transmitted from outside with the identification information stored in the identification information storing means, and when the two do not match, determine that another microprocessor is executing the loading process.

Because it is possible to specify the microprocessor that is the object of data reloading (the microprocessor to execute a loading process) by transmitting identification information into the electronic control unit from outside through the communication line and reload the control program and control data stored in the nonvolatile memory of that microprocessor with certainty, even if the number of microprocessors used in the electronic control unit increases it is possible to handle them easily without adding special circuits.

As the identification information storing means, the reloadable nonvolatile memory may be used or another nonvolatile memory inside the microprocessor may be used. Instead of the identification information being stored in the form of data, identification information may be assigned to each of the microprocessors by a predetermined input port of the microprocessor being pulled high or pulled low. In this case, since the input port is equivalent to identification information storing means, the determining means can ascertain its own respective identification code by reading the input level of that input port.

If the nonvolatile memory is reloadable with data when a predetermined loading voltage is impressed and each of the microprocessors deems that the reloading condition has been established and executes the loading process when the loading voltage is supplied to it and the electronic control unit further includes voltage supplying means for supplying the loading voltage to one of the microprocessors at a time, the determining means provided in each of the microprocessors need only monitor whether or not the loading voltage is being supplied to another microprocessor and when the loading voltage is being supplied to another microprocessor, determine that another microprocessor is executing the loading process.

By a loading voltage being supplied to any one of the microprocessors by the voltage supplying means, a control program and control data stored in the nonvolatile memory of any of the microprocessors can be reloaded, and because it is not necessary to prestore identification information in the microprocessors, the manufacturability of the unit can be increased.

That is, when the microprocessors used in the electronic control unit all have the same specifications, it is sufficient to install them in the unit without particularly distinguishing them from each other and then newly load data (a control program and control data) into the nonvolatile memory of each of the microprocessors after that, and therefore in the manufacture of the electronic control unit it is possible to cut out a management process for distinguishing the respective microprocessors.

As the voltage supplying means, a power supply circuit disposed inside the electronic control unit and outputting a loading voltage to any of the microprocessors according to an external command can be used. It is also possible to employ a construction wherein multiple power supply lines extending from loading voltage input terminals of the microprocessors outside the electronic control unit are provided as the voltage supplying means and the loading voltage is selectively supplied from outside exclusively to any one of these power supply lines.

When a construction is employed wherein the voltage supplying means outputs a loading voltage to any microprocessor according to an external command, a still greater effect can be obtained.

In this electronic control unit, the voltage supplying means is constructed so that when a power supply to the electronic control unit is switched on while the voltage supplying means is receiving from outside any one of multiple loading permission signals set in respective correspondence with the microprocessors, the voltage supplying means starts supplying the loading voltage to the microprocessor corresponding to that loading permission signal and when the voltage supplying means stops receiving the loading permission signal or the power supply to the electronic control unit is switched off, the voltage supplying means stops supplying the loading voltage.

With this construction, by switching on the power supply to the electronic control unit while applying a loading permission signal corresponding to the microprocessor that is the object of reloading, it is possible to supply a loading voltage to that microprocessor and thereby make it execute the loading process, and thus it is possible to reload the control program and control data stored in the nonvolatile memory of any of the microprocessors, while reversely, when the power supply to the electronic control unit has already been switched on, even if the above-mentioned loading permission signal is incorrectly applied as a result of an influence such as noise, the voltage supplying means does not supply a loading voltage to any of the microprocessors. Thus, it is possible to certainly prevent the content loaded in the nonvolatile memory of any of the microprocessors from being reloaded at an inappropriate time.

Each of the microprocessors may have a switching device capable of making or breaking an electrical path between the inside of that microprocessor and the communication line, and the transmission prohibiting means provided in each of the microprocessors may prohibit the transmission of data from its microprocessor to the communication line by causing the switching device to break the electrical path.

When any one of the microprocessors is executing a loading process, the other microprocessors can be certainly prohibited from transmitting data to the communication line.

Also, the transmission prohibiting means provided in each of the microprocessors may prohibit the transmission of data from its microprocessor to the communication line by prohibiting the execution by its microprocessor of a program for transmission processing provided for conducting data transmission.

When any one of the microprocessors is executing a loading process, the other microprocessors can be easily prohibited from transmitting data to the communication line.

Besides being realized by determining means and transmission prohibiting means provided in each of the microprocessors, the function of the communication operation controlling means can also be realized wherein the nonvolatile memory is reloadable with data when a predetermined loading voltage is impressed and each of the microprocessors deems that the reloading condition has been established and executes the loading process when the loading voltage is supplied to it and the electronic control unit further includes voltage supplying means for supplying the loading voltage to one of the microprocessors at a time. Also, the communication operation controlling means may consist of a connection switching circuit for specifying a microprocessor to which the loading voltage is being supplied by the voltage supplying means and connecting only the specified microprocessor to the communication line.

That is, in this eighth electronic control unit, instead of providing determining means and transmission prohibiting means in each of the microprocessors, a connection switching circuit for connecting only a microprocessor supplied with a loading voltage to the communication line and executing a loading process for reloading data is provided separately from the microprocessors.

With this construction, it is possible to certainly reload the control program and control data stored in any of the microprocessors without prestoring identification information inside the microprocessors, and in the manufacture of the electronic control unit it is possible to cut out a management process for distinguishing the respective microprocessors.

Also, it is possible to certainly prevent the content loaded in the nonvolatile memory of any of the microprocessors being reloaded at an inappropriate time.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIGS. 17A–17F are graphs illustrating the operation of the loading voltage generating part shown in FIG. 16;

FIG. 18 is a flowchart showing a transmission control process executed by the main microprocessor and the sub-microprocessor of the sixth preferred embodiment.

DETAILED DESCRIPTION OF THE PRESENTLY PREFERRED EXEMPLARY EMBODIMENTS

Preferred embodiments of the invention will now be described with reference to the accompanying drawings. However, the invention is not limited by the preferred embodiments described in the following and various changes and modifications can of course be made to these preferred embodiments within the technological scope of the invention.

First Preferred Embodiment

Figure 1:
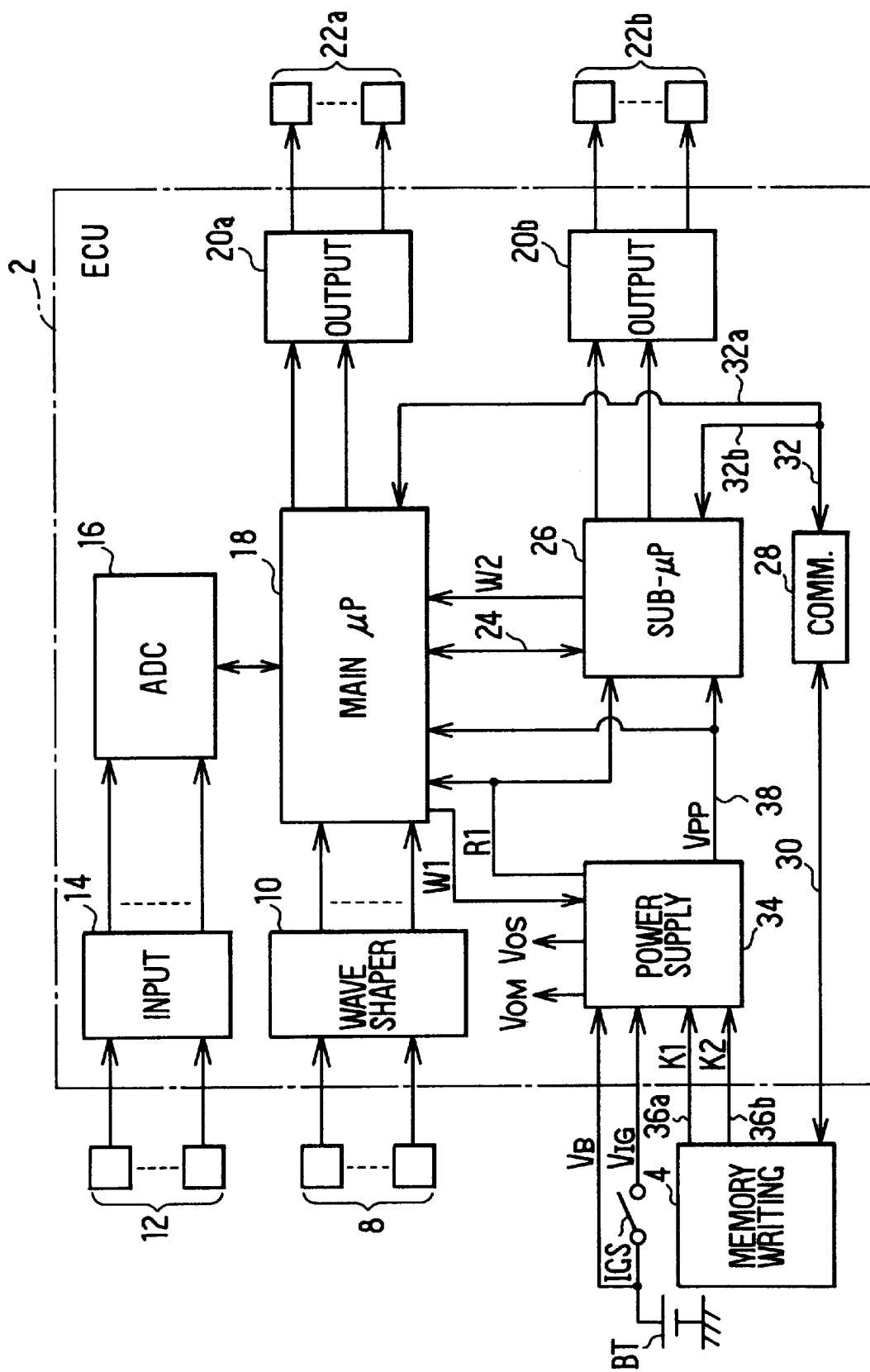
FIG. 1 is a block diagram showing the overall construction of a memory reloading system of an electronic control unit according to a first preferred embodiment of the invention.

FIG. 1 is a block diagram showing the overall construction of a memory reloading system of an electronic control unit according to a first preferred embodiment of the invention, made up of an electronic control unit (hereinafter abbreviated as "ECU") 2 installed in a vehicle which controls an internal combustion engine and an automatic transmission of the vehicle, and a memory loading unit 4 which is connected to the ECU 2 when control programs and control data for engine control and for automatic transmission control stored in the ECU 2 are to be reloaded or newly loaded.

As shown in FIG. 1, the ECU 2 includes a waveform shaping circuit 10 for receiving waveform shaping signals from various sensors 8 and outputting pulse signals and on/off signals corresponding to the state of rotation of the engine, an input circuit 14 for receiving and carrying out noise removal on signals from various sensors 12 outputting analog signals corresponding to the intake air flow and throttle angle, etc., of the engine, an A/D converter (ADC) 16 for converting analog signals from the input circuit 14 into digital signals, a single chip microprocessor for engine control (hereinafter referred to as the main microprocessor) 18 for computing control inputs of fuel injection quantity and ignition timing, etc., to the engine on the basis of signals from the A/D converter 16 and the waveform shaping circuit 10 and outputting control signals on the basis of the results of these computations, and an output circuit 20a for receiving control signals from the main microprocessor 18 and driving actuators 22a such as injectors and spark plugs mounted in the engine.

The ECU 2 also has a single chip microprocessor for automatic transmission control (hereinafter referred to as the sub-microprocessor) 26 for exchanging control information such as throttle angle and torque control signals with the main microprocessor 18 through a DMA (Direct Memory Access) communication line 24 and computing gear-change timing, etc., of the automatic transmission and outputting control signals, and an output circuit 20b for receiving control signals from the sub-microprocessor 26 and driving actuators 22b such as linear solenoids for gear-changing mounted in the automatic transmission.

Also, the ECU 2 has a communication circuit 28 for the main microprocessor 18 and the sub-microprocessor 26 to each carry out serial data communication with the memory loading unit 4, which is an external device, and this communication circuit 28 is disposed between a serial communication line 30 connected to the memory loading unit 4 by a connector (not shown) and a serial communication line 32 connected inside the ECU 2 to both of the microprocessors 18, 26. On its way from the communication circuit 28 to the two microprocessors 18, 26 the serial communication line 32 branches into a serial communication line 32a connecting the communication circuit 28 to the main microprocessor 18 and a serial communication line 32b connecting the communication circuit 28 to the sub-microprocessor 26.

The communication circuit 28 sends data transmitted to it through the serial communication line 30 from the memory loading unit 4 to the microprocessors 18, 26 through the serial communication line 32 and sends data it receives through the serial communication line 32 from the microprocessors 18, 26 to the memory loading unit 4 through the serial communication line 30.

The ECU 2 also has a power supply circuit 34 for receiving a voltage (hereinafter called the battery voltage) VB supplied to it directly from a battery BT mounted in the vehicle and a voltage (hereinafter called the IG voltage) VIG supplied to it from the battery BT by way of an ignition switch IGS of the vehicle and for supplying various voltages to the microprocessors 18, 26 and their peripheral circuits (the A/D converter 16 and the output circuits 20a, 20b and so on), as will be further discussed later.

The power supply circuit 34 may be a discrete circuit, or it may be implemented as an integrated circuit, either separately or integral with the microprocessor.

A watchdog timer clearing signal (hereinafter called the WDC signal) W1, which is a monitor signal, outputted from the main microprocessor 18 as will be further discussed later, is inputted into the power supply circuit 34. The power supply circuit 34 has a watchdog timer function of, when the WDC signal W1 from the main microprocessor 18 does not invert within a preset time, inferring that a failure has occurred in either the main microprocessor 18 or the sub-microprocessor 26 and outputting to the microprocessors 18, 26 a reset signal R1 to reset them.

Next, with reference to FIG. 2, the internal construction of the main microprocessor 18 and of the sub-microprocessor 26 of the ECU 2 will be described.

Figure 2:
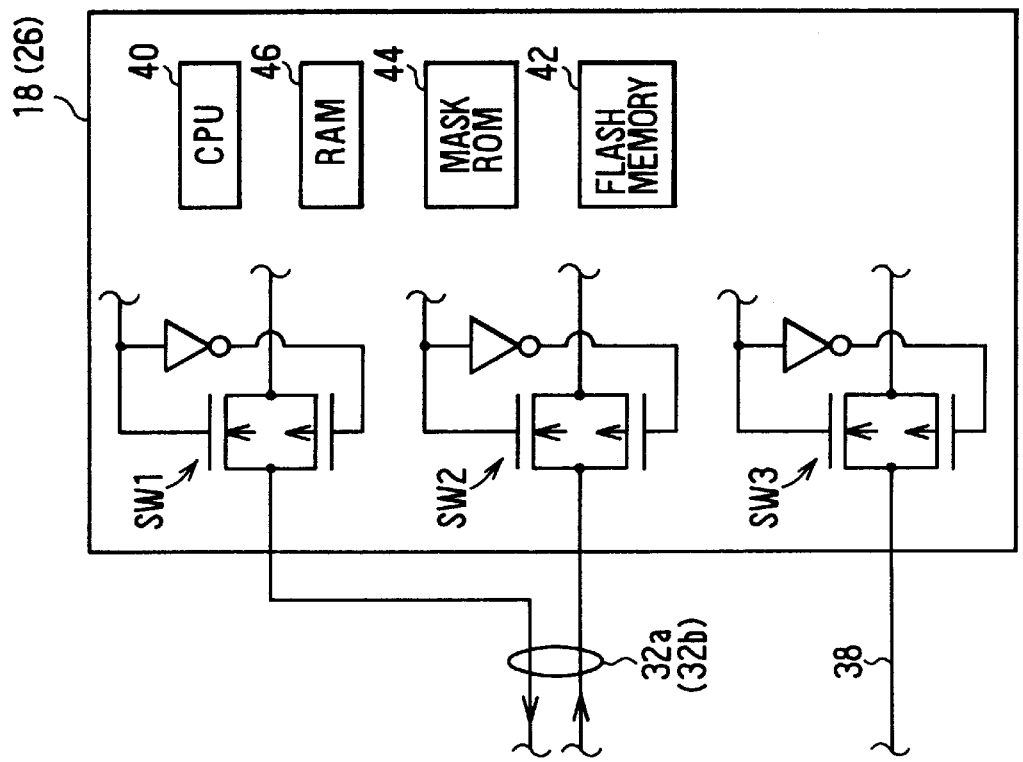
FIG. 2 is a schematic view showing the internal construction of a main microprocessor and a sub-microprocessor shown in FIG. 1.

As shown in FIG. 2, each of the two microprocessors 18, 26 has an ordinary CPU 40 which operates according to a program, a nonvolatile flash memory 42 and a mask ROM 44 for holding programs and data needed to operate the CPU 40, a RAM 46 for temporarily storing computation results of the CPU 40 and the like, and I/O devices (not shown) for inputting and outputting signals.

Here, the flash memory 42 is a nonvolatile ROM into which reloading of data (specifically, erasing and writing of data) is possible when a predetermined loading voltage (in this preferred embodiment, 7.5 V) VPP is applied.

A control program for engine control or for automatic transmission control to be executed by the CPU 40 and control data to be referenced at the time of its execution is newly loaded into the flash memory 42 of each of the microprocessors 18, 26 after the microprocessors 18, 26 are mounted in the process of manufacturing the ECU 2. Specifically, data constituting a control program and control data for engine control is newly loaded into the flash memory 42 of the main microprocessor 18 and data constituting a control program and control data for automatic transmission control is newly loaded into the flash memory 42 of the sub-microprocessor 26.

The control program for engine control loaded into the flash memory 42 of the main microprocessor 18 includes a signal output program for outputting a WDC signal W1 whose signal level inverts at intervals of a predetermined time TS1 (in this preferred embodiment, 4 ms) to the power supply circuit 34 and a monitoring process program for monitoring the operation of the sub-microprocessor 26, and the control program for automatic transmission control loaded into the flash memory 42 of the sub-microprocessor 26 includes a signal output program for outputting a WDC signal W2 whose signal level inverts at intervals of a predetermined time TS2 (in this preferred embodiment 4 ms, the same as the above-mentioned time TS1) to the main microprocessor 18.

In the following description, where there is no particular mention of the effect of control programs or the like being newly loaded into the flash memory 42, it will be assumed that the control programs and control data mentioned above respectively corresponding to the roles of the respective microprocessors 18, 26 have already been loaded into the flash memories 42 of the microprocessors 18, 26.

The mask ROM 44 is a nonvolatile ROM into which reloading of data is not possible, and in this mask ROM 44 a boot program executed immediately after resetting (initialization) of the respective microprocessor 18, 26 is terminated is prestored before the installation of the microprocessors 18, 26 into the ECU 2.

Also prestored in the mask ROM 44 of each of the microprocessors 18, 26 is an identification code by which the respective microprocessor 18, 26 can be identified, and in this preferred embodiment the identification code of the main microprocessor 18 is "0001" and the identification code of the sub-microprocessor 26 is "0010".

The processing content of the boot programs respectively stored in the mask ROM 44 of the two microprocessors 18, 26 is the same. A nonvolatile ROM into which data can be electrically reloaded as in the case of the flash memory 42 may be used instead of the mask ROM 44 as long as the reloading of data is prohibited.

Also, inside each of the microprocessors 18, 26, in an electrical path for transmitting serial data to the above-mentioned serial communication line 32 (specifically, the serial communication line 32a in the case of the main microprocessor 18 and the serial communication line 32b in the case of the sub-microprocessor 26), a switch device SW1 for making or breaking that path according to a command from the CPU 40 is provided, and similarly, in an electrical path for receiving serial data from the serial communication line 32, a switch device SW2 for making or breaking that path according to a command from the CPU 40 is provided.

As shown in FIG. 1, the above-mentioned loading voltage VPP necessary when data is to be loaded into the flash memory 42 is supplied to the main microprocessor 18 and the sub-microprocessor 26 from the power supply circuit 34 through a common power supply line 38. As shown in FIG. 2, inside each of the microprocessors 18, 26, also in an electrical path for receiving the loading voltage VPP from the power supply line 38, a switch device SW3 for making or breaking that path according to a command from the CPU 40 is provided. The initial state of all of the above-mentioned switch devices SW1 through SW3 is the on-state (in which they make the respective path).

In these microprocessors 18, 26, immediately after reset termination the CPU 40 starts to execute the boot program in the mask ROM 44, and during normal operation, when the memory loading unit 4 is not connected to the ECU 2, according to that the boot program calls the control program inside the flash memory 42 (in the case of the main microprocessor 18 the control program for engine control and in the case of the sub-microprocessor 26 the control program for automatic transmission control) and executes that control program and thereby carries out control processing for controlling the engine or the automatic transmission.

The sub-microprocessor 26, as it executes the control program for automatic transmission control (specifically, the above-mentioned signal output program included therein), outputs the WDC signal W2 whose signal level inverts at intervals of the predetermined time TS2 to the main microprocessor 18. The main microprocessor 18, along with the execution of the control program for engine control (specifically, the above-mentioned signal output program and monitoring process program included therein), outputs the WDC signal W1 whose signal level inverts at intervals of the predetermined time TS1 to the power supply circuit 34 and monitors the WDC signal W2 from the sub-microprocessor 26, and when the level of that WDC signal W2 does not invert within a determination time TH2 (>TS2) set longer than the predetermined time TS2 infers that a failure has occurred in the execution of the control program in the sub-microprocessor 26 and stops the level-inverting output of its own WDC signal W1 to the power supply circuit 34.

When on starting to execute the boot program the CPU 40 of either of the microprocessors 18, 26 determines that the microprocessor is in a loading mode, as will be further discussed later, without immediately calling the control program in the flash memory 42 the CPU 40 continues the execution of the boot program and in accordance with the boot program carries out a loading process for loading load data (that is, data constituting a new control program and control data to be loaded into the flash memory 42) into the flash memory 42 and thereby updates the flash memory 42. After this loading process ends, the CPU 40 calls the new control program loaded into the flash memory 42 and carries out the same processing as during the normal operation described above.

Next, using FIG. 3, the construction and functioning of the power supply circuit 34 of the ECU 2 will be described.

Figure 3:
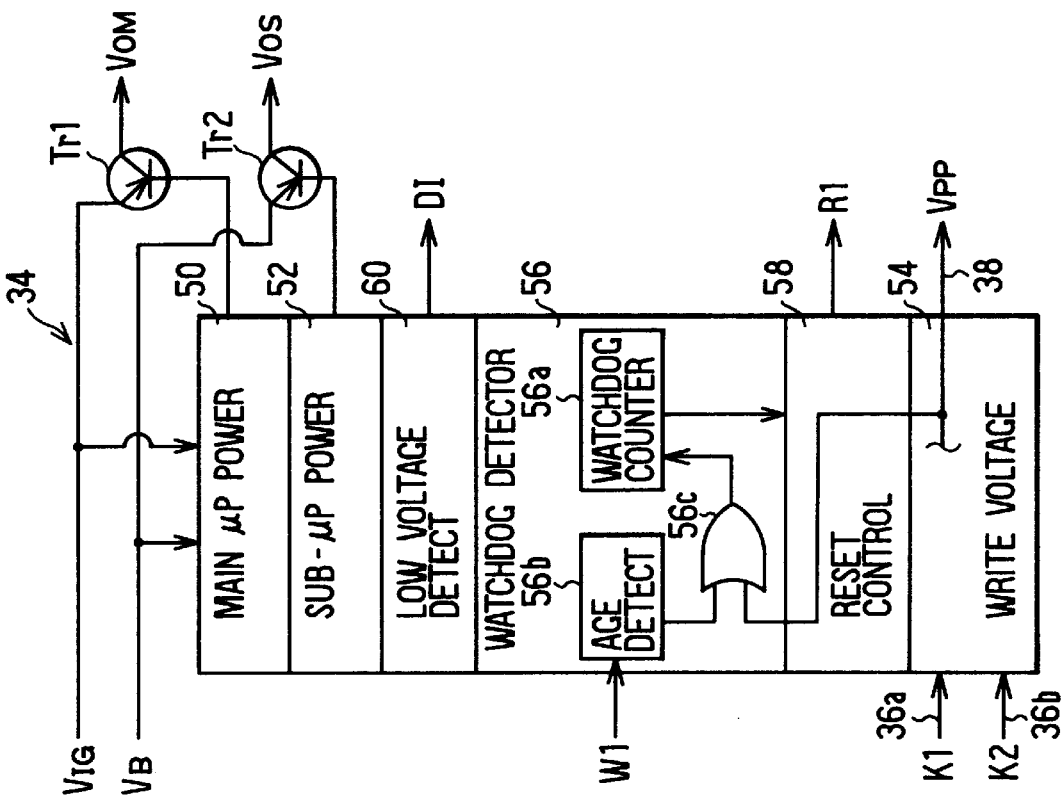
FIG. 3 is a schematic view showing the construction of a power supply circuit shown in FIG. 1.

As shown in FIG. 3, the power supply circuit 34 has two PNP-type transistors Tr1, Tr2 for constant voltage output, a main power supply generating part 50 for receiving the IG voltage VIG supplied when the ignition switch IGS is On and for causing a predetermined operating voltage (in this preferred embodiment, 5 V) VOM to be supplied from the transistor Tr1 to the two microprocessors 18, 26 and to peripheral circuits such as the A/D converter 16, and a sub power supply generating part 52 for receiving the battery voltage VB constantly supplied from the battery BT and causing a backup voltage for power supply backup (in this preferred embodiment, 5 V, the same as the above-mentioned operating voltage VOM) VOS to be supplied from the transistor Tr2 to the two microprocessors 18, 26 at all times.

The reason for providing the sub power supply generating part 52 and always supplying the backup voltage VOS to the microprocessors 18, 26 is that in this preferred embodiment some of the storage area of the RAM 46 built into each of the two microprocessors 18, 26 is set as standby RAM for continuing to hold data even when the ignition switch IGS is Off; when this kind of standby RAM is unnecessary, the sub power supply generating part 52 and the transistor Tr2 can be dispensed with.

The power supply circuit 34 also has a loading voltage generating part 54 which inputs loading permission signals K1, K2 outputted selectively one at a time from the memory loading unit 4 as will be further discussed later through two signal lines 36a, 36b, and while one or the other of these loading permission signals K1, K2 is being inputted and the ignition switch IGS is On and therefore the operating voltage VOM is being outputted generates the above-mentioned loading voltage VPP from the battery voltage VB or the IG voltage VIG and outputs that loading voltage VPP to the power supply line 38 (and hence to the two microprocessors 18, 26).

The power supply circuit 34 also has a watchdog detecting part 56 for detecting whether or not the level of the WDC signal W1 from the main microprocessor 18 has inverted within a determination time TH1 (>TS1) longer than the above-mentioned predetermined time TS1 and a reset control part 58 which outputs the high-active reset signal R1 to the main microprocessor 18 and the sub-microprocessor 26 and thereby resets the microprocessors 18, 26 when it is detected by this watchdog detecting part 56 that the level of the WDC signal W1 has not inverted within the determination time TH1 and also when the ignition switch IGS is switched on and the operating voltage VOM rises.

Here, the watchdog detecting part 56 is made up of a watchdog counter 56a for carrying out an up-counting operation at intervals of a fixed period TC on the basis of a clock signal from a signal-generating circuit (not shown), an edge detecting circuit 56b for outputting a pulse signal for resetting the watchdog counter 56a (i.e., clearing to zero the count value of the watchdog counter 56a) every time the level of the WDC signal W1 from the main microprocessor 18 changes, and an OR circuit 56c which inputs the pulse signal from this edge detecting circuit 56b and the loading voltage VPP from the above-mentioned loading voltage generating part 54, and when the loading voltage VPP from the loading voltage generating part 54 is not being outputted resets the watchdog counter 56a every time the above-mentioned pulse signal is outputted from the edge detecting circuit 56b, and when the loading voltage VPP is being outputted from the loading voltage generating part 54 resets the watchdog counter 56a continuously.

When the count value of the watchdog counter 56a reaches an overflow value M, the reset control part 58 infers that the level of the WDC signal W1 from the main microprocessor 18 has not inverted within the above-mentioned determination time TH3 and outputs the reset signal R1 to the two microprocessors 18, 26. The time (TC·M) obtained by multiplying the fixed period TC at which the watchdog counter 56a up-counts by the overflow value M of the watchdog counter 56a is the above-mentioned determination time TH1.

Therefore, if the loading voltage VPP is not being outputted from the loading voltage generating part 54, when the level of the WDC signal W1 from the main microprocessor 18 has not inverted within the above-mentioned determination time TH1 the two microprocessors 18, 26 are reset by the reset control part 58, but if the loading voltage VPP is being outputted from the loading voltage generating part 54, the watchdog counter 56a is continuously reset by the OR circuit 56c and its up-counting operation is thereby forcibly stopped and resetting of the microprocessors 18, 26 by the reset control part 58 is consequently prevented.

The power supply circuit 34 also has a low-voltage detecting part 60 for detecting on the basis of the IG voltage VIG that the output voltage of the battery BT is low, and, although it is not illustrated in FIG. 1, when the output voltage of the battery BT falls below a predetermined value an alarm signal D1 is outputted from this low-voltage detecting part 60 to at least one or the other of the main microprocessor 18 and the sub-microprocessor 26.

The memory loading unit 4 is constructed around an ordinary microprocessor having a CPU, ROM, RAM and so on, and is connected to the ECU 2 by way of a connector (not shown). When so connected, as shown in FIG. 1, the memory loading unit 4 is thereby connected to the serial communication line 30 of the ECU 2 and to the two signal lines 36a, 36b extending from the power supply circuit 34 (from the loading voltage generating part 54).

Also, although it is not shown in the drawings, the memory loading unit 4 has a starting switch for operating the unit and a selection switch for selecting which of the flash memories 42 of the main microprocessor 18 and the sub-microprocessor 26 data is to be loaded into, and also has a storage medium such as a ROM or a floppy disc in which is stored this load data (data constituting a new control program and control data) to be transmitted to the ECU 2 and a display part for displaying various messages.

The load data to be sent to the ECU 2 and an identification code of the microprocessor (either the main microprocessor 18 or the sub-microprocessor 26) into which this load data is to be loaded are stored in the above-mentioned storage medium.

The load data to be loaded into the flash memory 42 of the main microprocessor 18 includes a signal output program for making the main microprocessor 18 output the WDC signal W1 to the power supply circuit 34 and a monitoring process program for monitoring the operation of the sub-microprocessor 26 and the load data to be loaded into the flash memory 42 of the sub-microprocessor 26 includes a signal output program for making the sub-microprocessor 26 output the WDC signal W2 to the main microprocessor 18.

Figure 6:
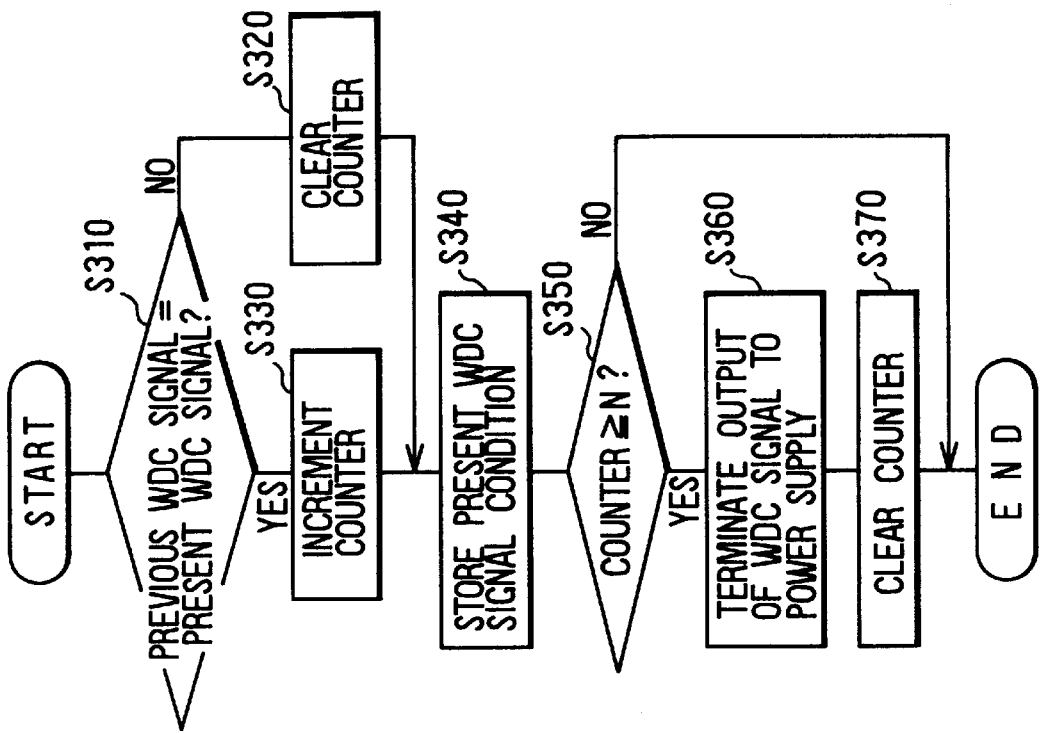
FIG. 6 is a flowchart showing a sub-microprocessor monitoring process executed by the main microprocessor in the first embodiment.
Figure 4:
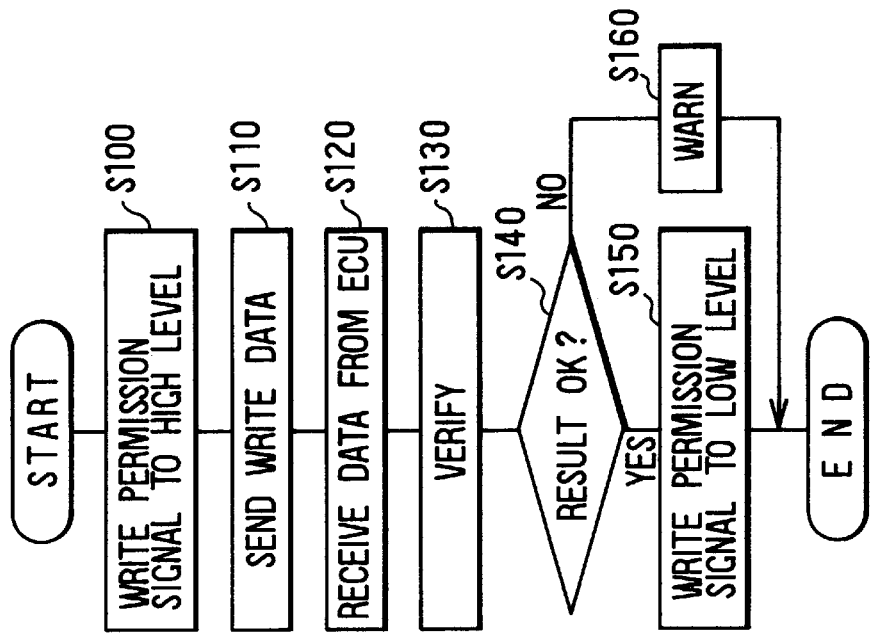
FIG. 4 is a flowchart showing processing executed by the memory reloading system according to the first embodiment.
Figure 5:
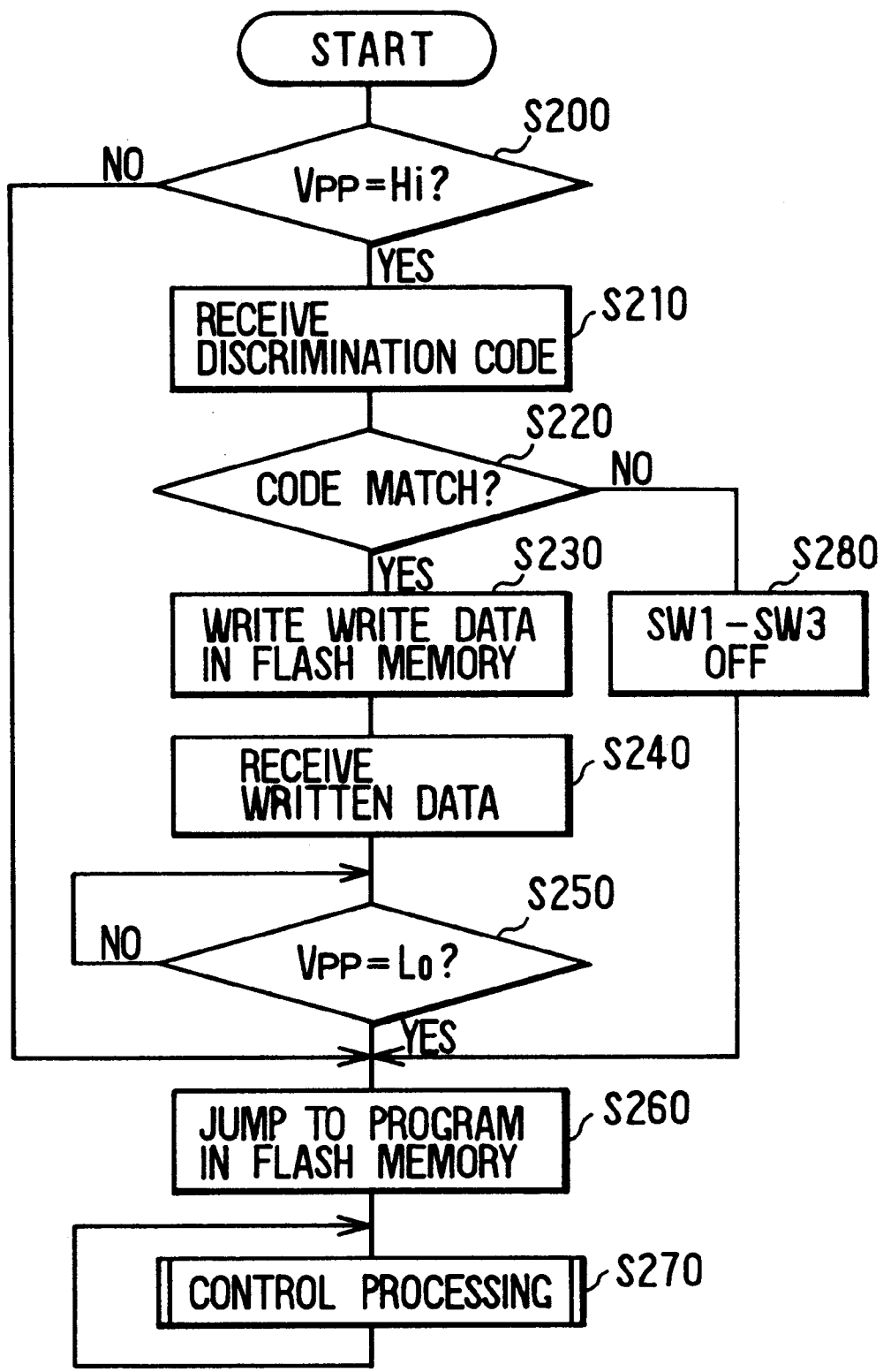
FIG. 5 is a flowchart showing processing executed by the main microprocessor and by the sub-microprocessor in the first embodiment.

Next, using the flowcharts of FIG. 4 through FIG. 6, processing executed by the memory loading unit 4 and processing executed by the two microprocessors 18, 26 of the ECU 2 in the memory reloading system of this first preferred embodiment of the invention will be described. FIG. 4 is a flowchart showing processing executed by the memory loading unit 4; FIG. 5 is a flowchart showing processing executed by each of the microprocessors 18, 26, wherein the processing of steps (hereinafter denoted simply with the letter S) from S200 to S260 is executed by the boot program in the mask ROM 44 and the processing of S270 is executed by the control program in the flash memory 42; and FIG. 6 is a flowchart showing a sub-microprocessor monitoring process executed by the main microprocessor 18 according to the monitoring process program included in the control program in the flash memory 42 thereof in order to monitor the operation of the sub-microprocessor 26.

First, when the memory loading unit 4 has been connected to the ECU 2 by an operator and the above-mentioned starting switch is switched on the microprocessor in the memory loading unit 4 starts to execute the processing shown in FIG. 4. It will be assumed that when data is to be newly loaded into the flash memory 42 of the main microprocessor 18 or when data already stored therein is to be reloaded, the main microprocessor 18 has been selected as the object of data loading by means of the above-mentioned selection switch and the identification code of the main microprocessor 18 and the load data to be loaded into the flash memory 42 thereof have been stored in the above-mentioned storage medium in advance. Similarly, it will be assumed that when data is to be newly loaded into the flash memory 42 of the sub-microprocessor 26 or when data already stored therein is to be reloaded, the sub-microprocessor 26 has been selected as the object of data loading by means of the above-mentioned selection switch and the identification code of the sub-microprocessor 26 and the load data to be loaded into the flash memory 42 thereof have been stored in the above-mentioned storage medium in advance.

As shown in FIG. 4, when execution of processing starts on the memory loading unit 4 side, in a first step S100, when the main microprocessor 18 has been selected as the object of data loading by means of the selection switch, the high-active loading permission signal K1 is outputted to the signal line 36a, and when the sub-microprocessor 26 has been selected as the object of data loading the high-active loading permission signal K2 is outputted to the signal line 36b. As a result of one or the other of the loading permission signals K1, K2 being outputted from the memory loading unit 4 to the ECU 2 in this way, the power supply circuit 34 (the loading voltage generating part 54) on the ECU 2 side is enabled to supply the loading voltage VPP to the two microprocessors 18, 26.

Then, in the following S110, the identification code and the load data stored in the storage medium are read and the identification code and the load data read are sequentially transmitted to the ECU 2 through the serial communication line 30. By this transmission operation, first the identification code is transmitted to the ECU 2 and then the load data is transmitted thereafter.

When this happens, as will be further discussed later, the load data transmitted in the above-mentioned S110 is loaded as an update into the flash memory 42 of whichever of the two microprocessors 18, 26 on the ECU 2 side is the object of data loading, and that loaded data is then read and returned from the ECU 2 side and accordingly in the following S120 data from the ECU 2 is received and in S130 the data from the ECU 2 received in S120 is verified by being compared with the load data stored in the storage medium.

Then, in the following S140, the verification result of S130 is determined, and if the data from the ECU 2 matched the load data stored in the storage medium it is inferred that the load data transmitted in S110 was loaded correctly into the flash memory 42 of the microprocessor that is the object of loading and processing proceeds to S150. In this S150, the loading permission signal K1 or K2 that had been being outputted to one or the other of the signal lines 36a, 36b in S110 is returned to a low level and then the processing ends.

When on the other hand it is determined in S140 that the load data stored in the storage medium and the data from the ECU 2 do not match, processing shifts to S160 and a warning message indicating that the loading of data was unsuccessful is displayed on the above-mentioned display part and that processing then ends.

Meanwhile on the ECU 2 side, when the ignition switch IGS is turned on, as a result of the working of the reset control part 58 of the power supply circuit 34 each of the microprocessors 18, 26 starts operating from the reset state and executes the processing shown in FIG. 5.

That is, the CPU 40 of each of the two microprocessors 18, 26 first starts to execute the boot program stored in the mask ROM 44 and in a first step S200 determines whether or not the loading voltage VPP is being supplied from the power supply circuit 34 through the power supply line 38.

Here, when the ignition switch IGS is turned on, if the memory loading unit 4 is connected to the ECU 2 and furthermore one of the loading permission signals K1, K2 is being outputted from the memory loading unit 4 as a result of the processing of S100 in FIG. 4, because the loading voltage VPP is supplied to the two microprocessors 18, 26 from the loading voltage generating part 54 of the power supply circuit 34 through the power supply line 38, the determination in the above-mentioned S200 is affirmative (it is determined that the loading voltage VPP is being supplied).

When an affirmative determination is made in S200, processing proceeds to S210 and the identification code transmitted from the memory loading unit 4 through the serial communication line 30 as a result of the processing of the above-mentioned S110 in FIG. 4 is received and in the following S220 it is determined whether or not that received identification code matches the identification code stored in the mask ROM 44.

When in S220 it is determined that the two identification codes match, it is inferred that the ECU is in a loading mode, which is not its normal operating mode, and processing proceeds to the following S230. In this S230, the load data (data constituting a control program and control data) transmitted from the memory loading unit 4 after the identification code as described above is received and this received load data is loaded as an update into the flash memory 42. Also, in the following S240, all the data loaded into the flash memory 42 in the above-mentioned S230 is read and transmitted to the memory loading unit 4.

When this happens, the data transmitted to the memory loading unit 4 in this S240 is compared with the load data stored in the storage medium on the memory loading unit 4 side, as described above, and if the two sets of data match it is inferred that the data loading on the ECU 2 side ended without a hitch and the loading permission signal K1 or K2 that had been being outputted to the ECU 2 is returned to a low level. Together with this, on the ECU 2 side, the loading voltage generating part 54 of the power supply circuit 34 stops the supply of the loading voltage VPP.

In the following S250 processing stands by until the supply of the loading voltage VPP from the power supply circuit 34 is stopped, and when it determines that the supply of the loading voltage VPP has stopped infers that the load data from the memory loading unit 4 has been correctly loaded into the flash memory 42 and proceeds to the following S260.

In this S260 processing jumps to the control program in the flash memory 42 and starts execution of the control program loaded into the flash memory 42 in the processing of the above-mentioned S230. As a result, the microprocessor shifts to its normal operation and, as shown in S270 of FIG. 5, if it is the main microprocessor 18 it carries out control processing for engine control and if it is the sub-microprocessor 26 it carries out control processing to control the automatic transmission.

When on the other hand it is determined in the above-mentioned S200 that the loading voltage VPP is not being supplied, it is inferred that the ECU is in its normal operating mode and processing proceeds to S260 without executing the processing of the above-mentioned S210 through S250. In other words, during normal operation, i.e., when no loading permission signal K1, K2 is being outputted from the memory loading unit 4 to the ECU 2, execution of the control program already loaded into the flash memory 42 is started immediately.

Also, even if in the above-mentioned S200 it is determined that the loading voltage VPP is being supplied, when it is determined in the above-mentioned S220 that the identification code from the memory loading unit 4 and the own identification code stored in the mask ROM 44 do not match, processing infers that the microprocessor that is the object of data loading is not the present microprocessor (in other words, another microprocessor is the object of data loading) and proceeds to S280. In this S280, the three switch devices SW1 through SW3 shown in FIG. 2 are all turned off (so that they break their respective electrical paths) and processing then proceeds to S260.

That is, in the ECU 2 of this preferred embodiment, because the two microprocessors 18, 26 both conduct serial communication with the memory loading unit 4 using a single serial communication line 30, 32, when the microprocessor of either of them infers that a microprocessor other than itself is in the process of data loading, by means of the switch device SW1 or SW2 it breaks its own electrical connection with the serial communication line 32 and thereby forcibly prohibits itself from communicating with the serial communication line 32 and then starts executing the control program already loaded into its flash memory 42. As a result, the data received by the microprocessor in the process of data loading being destroyed by data transmitted from the other microprocessor is certainly prevented. The connection with the power supply line 38 is also broken by means of the switch device SW3 in order to certainly prevent data being accidentally loaded into the flash memory 42 that is not the object of data loading.

Here, when in the sub-microprocessor 26 execution of the control program stored in the flash memory 42 is started, thereafter the above-mentioned signal output program is executed at intervals of the predetermined time TS2 (4 ms) and the WDC signal W2, whose level inverts at intervals of that time TS2, is outputted from that sub-microprocessor 26 to the main microprocessor 18.

In the main microprocessor 18 also, when execution of the control program stored in the flash memory 42 is started, thereafter the signal output program is executed at intervals of the predetermined time TS1 (4 ms), and the WDC signal W1, whose level inverts at intervals of that time TS1, is outputted from that main microprocessor 18 to the watchdog detecting part 56 of the power supply circuit 34; however, also, in the main microprocessor 18, alternately with this signal output program, the monitoring process program for monitoring the operation of the sub-microprocessor 26 is executed, and thus the sub-microprocessor monitoring process shown in FIG. 6 is carried out every 4 ms.

As shown in FIG. 6, in this sub-microprocessor monitoring process, first, in a step S310, it is detected whether the signal level of the WDC signal W2 from the sub-microprocessor 26 is at a high level (5 V) or at a low level (0 V) and determined whether or not the signal level detected this time is the same as the signal level detected in the previous processing.

Here, since as mentioned above the WDC signal W2 from the sub-microprocessor 26 inverts every 4 ms and the sub-microprocessor monitoring process is also executed every 4 ms, if the control program is being executed normally in the sub-microprocessor 26, the signal level detected this time should be different from the signal level detected the previous time.

Therefore, in the above-mentioned S310, when it is determined that the signal level detected this time and the signal level detected the previous time are not the same, it is inferred that the sub-microprocessor 26 is operating normally and processing proceeds to S320 and clears the value in a counter memory (hereinafter simply called the counter) provided in a predetermined area of the RAM 46.

When on the other hand it is determined in S310 that the signal level detected this time and the signal level detected the previous time are the same, it is inferred that there is a possibility that a failure is occurring in the sub-microprocessor 26 and processing shifts to S330 and increments the above-mentioned counter.

Then, after clearing the counter in S320 or incrementing the counter in S330 processing proceeds to S340 and stores the signal level of the WDC signal W2 detected this time in S310 in the RAM 46 for reference in S310 next time and in the following S350 determines whether the value of the above-mentioned counter is equal to or greater than a predetermined value N (in this preferred embodiment, 22). The time (TS2·N=4 ms·22) obtained by multiplying this predetermined value N by the period at which the sub-microprocessor monitoring process is executed is the above-mentioned determination time TH2.

Here, if the value of the counter is not equal to or greater than the predetermined value N (S350: NO), the sub-microprocessor monitoring process ends at that point, but if the value of the counter is equal to or greater than the predetermined value N (S350: YES) then it is inferred that there has been a failure in the sub-microprocessor 26 and processing proceeds to S360 and prohibits the signal output program from being executed from then on and thereby stops the level of the WDC signal W1 from being inverted to the power supply circuit 34 from this main microprocessor 18. Then the value of the counter is cleared in the following S370 and that sub-microprocessor monitoring process is ended.

Figure 7A:
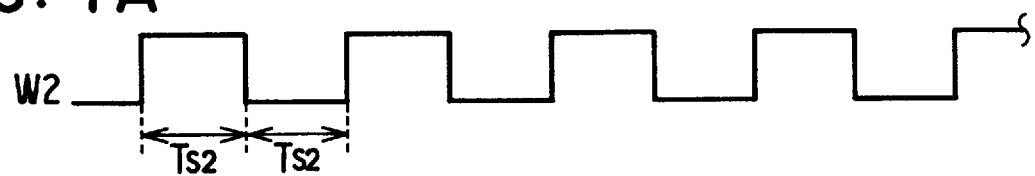
FIGS. 7A to 7C are graphs showing an action of the sub-microprocessor monitoring process of FIG. 6.

In the ECU 2 of the first preferred embodiment, when the control programs stored in the flash memories 42 of the two microprocessors 18, 26 are being executed normally, as shown in FIG. 7A, the level of the WDC signal W2 inverting at intervals of the predetermined time TS2 is outputted from the sub-microprocessor 26 to the main microprocessor 18, and also, like this WDC signal W2, the level of the WDC signal W1 inverting at intervals of the time TS1 is outputted from the main microprocessor 18 to the power supply circuit 34.

Every time the WDC signal W1 inverts, in the watchdog detecting part 56 of the power supply circuit 34, the watchdog counter 56a is reset by a pulse signal from the edge detecting circuit 56b, and by this operation being repeated a state wherein the reset signal R1 is not outputted from the reset control part 58 of the power supply circuit 34 to the two microprocessors 18, 26 is continued.

Figure 7B:
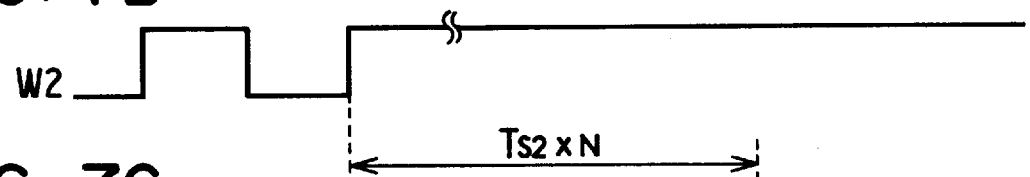
Figure 7C:
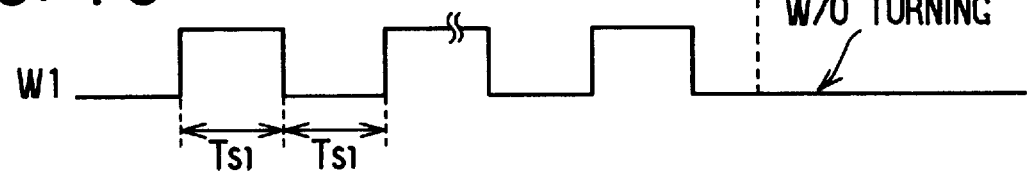

When on the other hand a failure occurs in the sub-microprocessor 26 and the inversion of the WDC signal W2 from the sub-microprocessor 26 to the main microprocessor 18 stops, as shown in FIG. 7B, in S350 of the sub-microprocessor monitoring process an affirmative determination is made after the predetermined determination time TH2 (=TS2·N=4 ms·22) elapses and in S360 of the same processing the inversion of the WDC signal W1 from the main microprocessor 18 to the power supply circuit 34 stops. When this happens, the counter value of the watchdog counter 56a in the power supply circuit 34 overflows and the reset signal R1 is outputted from the reset control part 58 to the two microprocessors 18, 26.

When a failure occurs in the main microprocessor 18 itself, even if the inversion of the WDC signal W1 from the main microprocessor 18 to the power supply circuit 34 has stopped, the counter value of the watchdog counter 56a overflows and the reset signal R1 is outputted from the reset control part 58 to the two microprocessors 18, 26.

As a result, even if program runaway occurs in one of the two microprocessors 18, 26, both of the microprocessors 18, 26 are swiftly reset and resume operation from an initialized state and control safety is thereby ensured.

Next, an operation carried out when newly loading a control program and control data into the flash memory 42 of either of the microprocessors 18, 26 or reloading a control program and control data already loaded will be described, taking as an example a case wherein a control program and control data for automatic transmission control are to be newly loaded into the flash memory 42 of the sub-microprocessor 26 when a control program and control data for engine control have already been loaded into the flash memory 42 of the main microprocessor 18.

In this case, an operator first stores in the storage medium of the memory loading unit 4 the identification code "0010" of the sub-microprocessor 26 and the load data to be loaded into the flash memory 42 of the sub-microprocessor 26. Then, the memory loading unit 4 is connected to the ECU 2, the sub-microprocessor 26 is selected as the object of data loading by means of the selection switch of the memory loading unit 4, and after that the starting switch of the memory loading unit 4 is turned on and the ignition switch IGS of the vehicle is turned on and the ECU 2 is thereby made to start operating from its initial state.

When this is done, because the loading permission signal K2 is outputted from the memory loading unit 4 to the ECU 2 through the signal line 36b (S100), along with the ignition switch IGS being turned on, on the ECU 2 side, the loading voltage VPP is supplied from the loading voltage generating part 54 of the power supply circuit 34 to the two microprocessors 18, 26 through the power supply line 38. Also, while the loading voltage VPP is being outputted from the loading voltage generating part 54, in the watchdog detecting part 56 of the power supply circuit 34, because the watchdog counter 56a is continuously reset by the OR circuit 56c, the two microprocessors 18, 26 are prevented from being reset by the operation of the watchdog detecting part 56 and the reset control part 58.

The identification code and the load data held in the storage medium are then sequentially transmitted from the memory loading unit 4 to the ECU 2 (S110), and on the ECU 2 side each of the two microprocessors 18, 26 executing the boot program stored in its mask ROM 44 receives the identification code from the memory loading unit 4 by way of the serial communication line 30, the communication circuit 28 and the serial communication line 32 (S200: YES, S210), and compares that received identification code with its own identification code stored in its mask ROM 44 (S220).

When this happens, in the main microprocessor 18, the two identification codes do not match (S220: NO) and the switch devices SW1 through SW3 all become Off and the electrical connection between the main microprocessor 18 and the serial communication line 32 and the power supply line 38 is thereby broken (S280), after which the control program in the flash memory 42 is executed (S260).

In the sub-microprocessor 26, on the other hand, the two identification codes do match (S220: YES), this sub-microprocessor 26 alone receives the load data from the memory loading unit 4, and that received load data is loaded as an update into the flash memory 42 (S230).

After that, the data thus loaded into the flash memory 42 of the sub-microprocessor 26 is transmitted from the sub-microprocessor 26 to the memory loading unit 4 by way of the serial communication line 32, the communication circuit 28 and the serial communication line 30 (S240), and in the memory loading unit 4 the data from the sub-microprocessor 26 is verified by being compared with the master load data held in the storage medium (S130). If the result of this verification is good (S140: YES), the loading permission signal K2 that had been outputted from the memory loading unit 4 returns to a low level (S150), and along with this, on the ECU 2 side, the supply of the loading voltage VPP to the two microprocessors 18, 26 stops.

When this happens, in the sub-microprocessor 26 also, execution of the control program loaded in the flash memory 42 is started (S250: YES, S260), and in the watchdog detecting part 56 of the power supply circuit 34 the continuous resetting of the watchdog counter 56a by the OR circuit 56c is ended and the ECU 2 returns to a state wherein the two microprocessors 18, 26 can be reset by the operation of the watchdog detecting part 56 and the reset control part 58 of the power supply circuit 34, i.e., the normal state wherein the operation of the microprocessors 18, 26 can be monitored.

At this state, the new loading of a control program and control data into the sub-microprocessor 26 ends.

The case of reloading a control program and control data already loaded into the flash memory 42 of the sub-microprocessor 26 is also exactly the same as the case of new loading described above. Also, when a control program and control data are to be newly loaded into the flash memory 42 of the main microprocessor 18 or a control program and control data already loaded therein are to be reloaded, this can be done by storing in the storage medium of the memory loading unit 4 the identification code "0001" of the main microprocessor 18 and the control program and control data to be loaded into the flash memory 42 of the main microprocessor 18 and selecting the main microprocessor 18 as the object of data loading by means of the selection switch of the memory loading unit 4.

In this first preferred embodiment, the main microprocessor 18 is equivalent to a first microprocessor and the sub-microprocessor 26 to a second microprocessor as recited in the appended claims; the OR circuit 56c of the watchdog detecting part 56 is equivalent to monitoring operation blocking means, or blocking means; the watchdog detecting part 56 and the reset control part 58 of the power supply circuit 34 are equivalent to system monitoring means; the watchdog counter 56a of the watchdog detecting part 56 is equivalent to a counter, and the reset control part 58 is equivalent to reset signal outputting means.

As described in detail above, in the ECU 2 of this first preferred embodiment of the invention, whether or not the control program in the flash memory 42 in the sub-microprocessor 26 is being executed normally is monitored by the main microprocessor 18 executing the control program in the flash memory 42 thereof, and when a failure of the sub-microprocessor 26 is detected, to reset the sub-microprocessor 26, the sub-microprocessor 26 stops the inversion of the WDC signal W1 outputted thereby to the watchdog detecting part 56 of the power supply circuit 34, but when in particular the loading voltage VPP is being supplied to the microprocessors 18, 26, the OR circuit 56c of the watchdog detecting part 56 forcibly stops the up-counting operation of the watchdog counter 56a so that the reset signal R1 is not outputted to the microprocessors 18, 26.

As a result, while the sub-microprocessor 26 is conducting a loading process (S210 through S250) to load data into the flash memory 42 thereof, the sub-microprocessor 26 being reset due to the above-mentioned monitoring operation of the main microprocessor 18 is prevented.

Therefore, in the process of manufacturing this ECU 2, after installing the microprocessors 18, 26, even when a loading sequence is employed wherein a control program and control data are newly loaded into the flash memory 42 of the main microprocessor 18 first and then after that a control program and control data are newly loaded into the flash memory 42 of the sub-microprocessor 26, which is the monitored side, the sub-microprocessor 26 in the middle of conducting a loading process being reset by the operation of the main microprocessor 18 that is the monitoring side is prevented.

Therefore, with the ECU 2 of this first preferred embodiment, whatever the order in which control programs and the like are loaded into the two microprocessors 18, 26, that loading can be carried out certainly, and even if there is the restriction that a control program must be loaded into the main microprocessor 18 that is the monitoring side before a control program is loaded into the sub-microprocessor 26 that is the monitored side, a control program and control data can nevertheless be certainly loaded into the sub-microprocessor 26 that is the monitored side. As a result, both the main microprocessor 18 monitoring the operation of the sub-microprocessor 26 and the ability to carry out on-board loading of control programs into the microprocessors 18, 26 can be realized at the same time with certainty.

Also, in the ECU 2 of this first preferred embodiment, when the inversion of the WDC signal W1 from the main microprocessor 18 stops, by means of the watchdog detecting part 56 and the reset control part 58 of the power supply circuit 34, the reset signal R1 is outputted to the two microprocessors 18, 26.

Therefore, a failure during normal operation of the microprocessors 18, 26 can be detected and resolved with a single pair of hardware circuits consisting of the watchdog detecting part 56 and the reset control part 58, and monitoring of the operation of the two microprocessors 18, 26 and reloading of a control program and control data stored in the flash memory 42 of either of the microprocessors 18, 26 can thus be realized at the same time with certainty by means of a simple construction.

In the first preferred embodiment described above, the microprocessors 18, 26 are prevented from being reset by the up-counting operation of the watchdog counter 56a being forcibly stopped, but alternatively a construction may be adopted wherein a switching device or a logical circuit device is provided in the signal line of the reset signal R1 running from the reset control part 58 to the two microprocessors 18, 26 and by means of this device that signal line is cut or held at a low level (a passive level) when the loading voltage VPP is being outputted from the loading voltage generating part 54.

Second Preferred Embodiment

In a memory reloading system of a second preferred embodiment of the invention, the ECU differs from the ECU 2 of the first preferred embodiment described above in points (1) and (2) below. The memory loading unit 4 is the same as that of the first preferred embodiment. Parts in this second preferred embodiment the same as parts in the first preferred embodiment have been given the same reference numerals as in the first preferred embodiment and will not be described in detail in the following.

Figure 8:
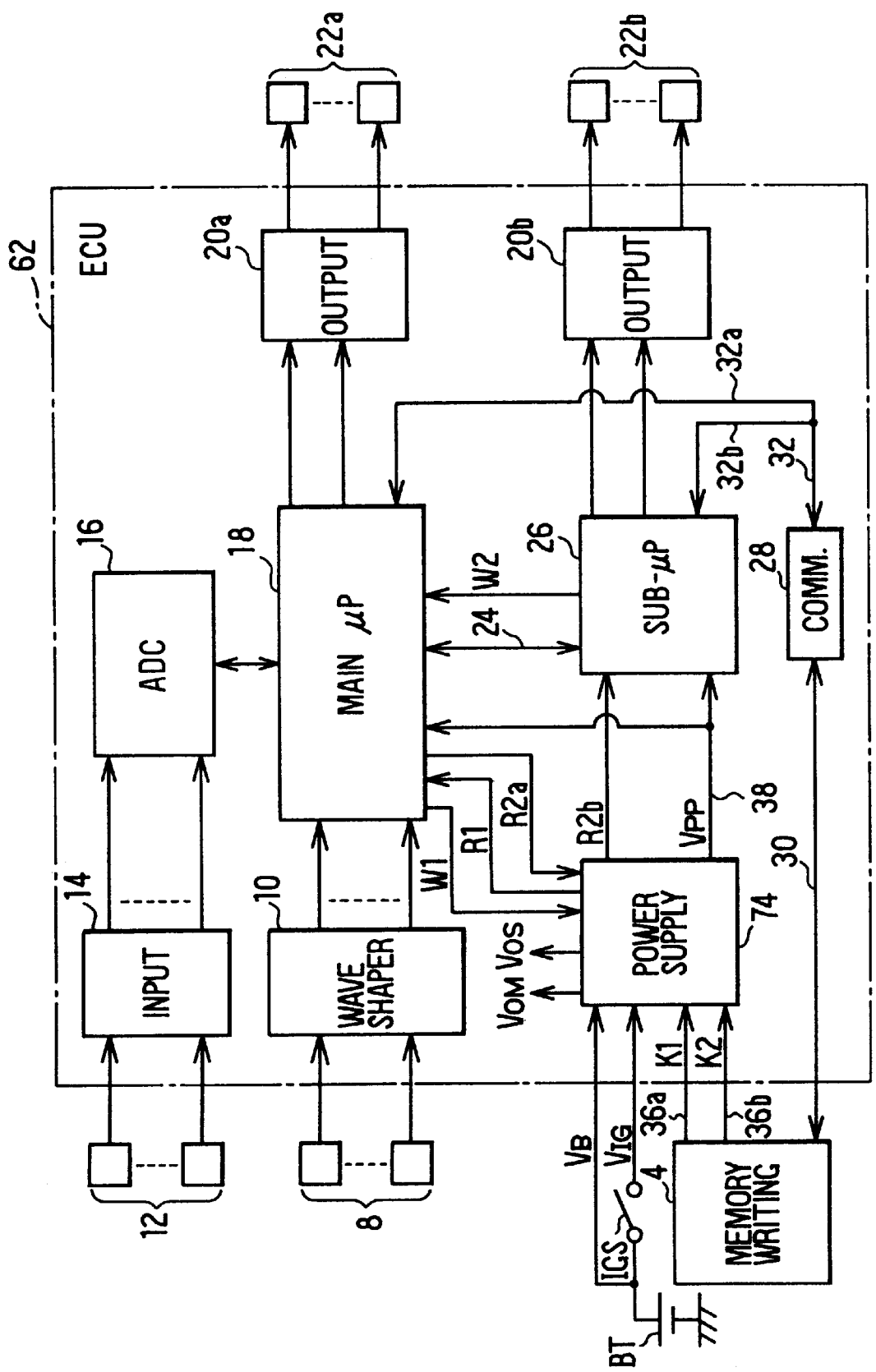
FIG. 8 is a block diagram showing the overall construction of a memory reloading system of an electronic control unit according to a second preferred embodiment of the invention.

(1) First, as shown in FIG. 8, in the ECU 62 of this second preferred embodiment, when the WDC signal W2 from the sub-microprocessor 26 does not invert within the above-mentioned determination time TH2, the main microprocessor 18 does not stop the inversion of its own WDC signal W1 but rather outputs a high-active reset signal R2a for resetting the sub-microprocessor 26.

Figure 10:
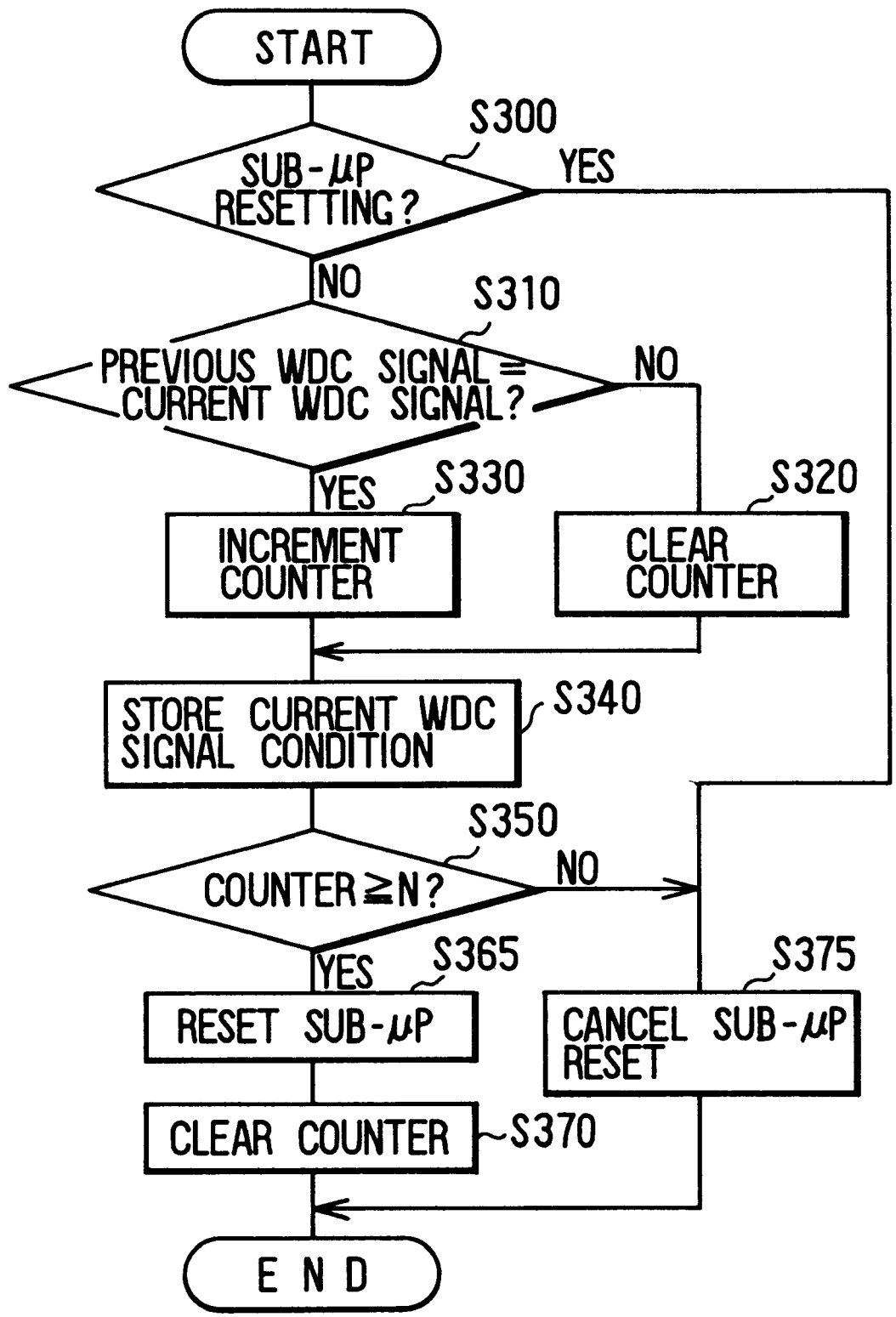
FIG. 10 is a flowchart showing a sub-microprocessor monitoring process executed by a main microprocessor of the second preferred embodiment.

For this, in the sub-microprocessor monitoring process carried out by execution of the monitoring process program in the main microprocessor 18, as shown in FIG. 10, with respect to the processing shown in FIG. 6, processing of steps S300 and S375 is added and instead of S360 of FIG. 6 processing of S365 is carried out.

That is, in the sub-microprocessor monitoring process of the second preferred embodiment, first, in S300, it is determined whether or not the main microprocessor 18 is in the process of resetting the sub-microprocessor 26, i.e., whether or not the main microprocessor 18 is outputting the above-mentioned reset signal R2a. If it is outputting the reset signal R2a, processing shifts to S375 and the outputting of the reset signal R2a is stopped (the signal is returned to a low level) to terminate the resetting of the sub-microprocessor 26, and then that sub-microprocessor monitoring process ends.

When in S300 it is determined that the main microprocessor 18 is not outputting the reset signal R2a, processing of S310 through S350 is executed, in the same way as in the case of the first preferred embodiment. When in S350 it is determined that the value of the counter is equal to or greater than the predetermined value N, processing infers that a failure has occurred in the sub-microprocessor 26 and proceeds to S365 and outputs the reset signal R2a (raises the signal to a high level) to reset the sub-microprocessor 26 and in the following S370 clears the counter and ends that sub-microprocessor monitoring process.

By means of this kind of sub-microprocessor monitoring process, when the WDC signal W2 from the sub-microprocessor 26 has not inverted within the determination time TH2, the main microprocessor 18 is made to output the reset signal R2a at a high level for a time (4 ms) equivalent to the period at which that sub-microprocessor monitoring process is executed.

(2) Next, as shown in FIG. 8, in the ECU 62 of this second preferred embodiment, a power supply circuit 74 is provided in place of the power supply circuit 34 and the above-mentioned reset signal R2a outputted from the main microprocessor 18 passes through this power supply circuit 74 and is inputted into the sub-microprocessor 26 as a reset signal R2b.

Figure 9:
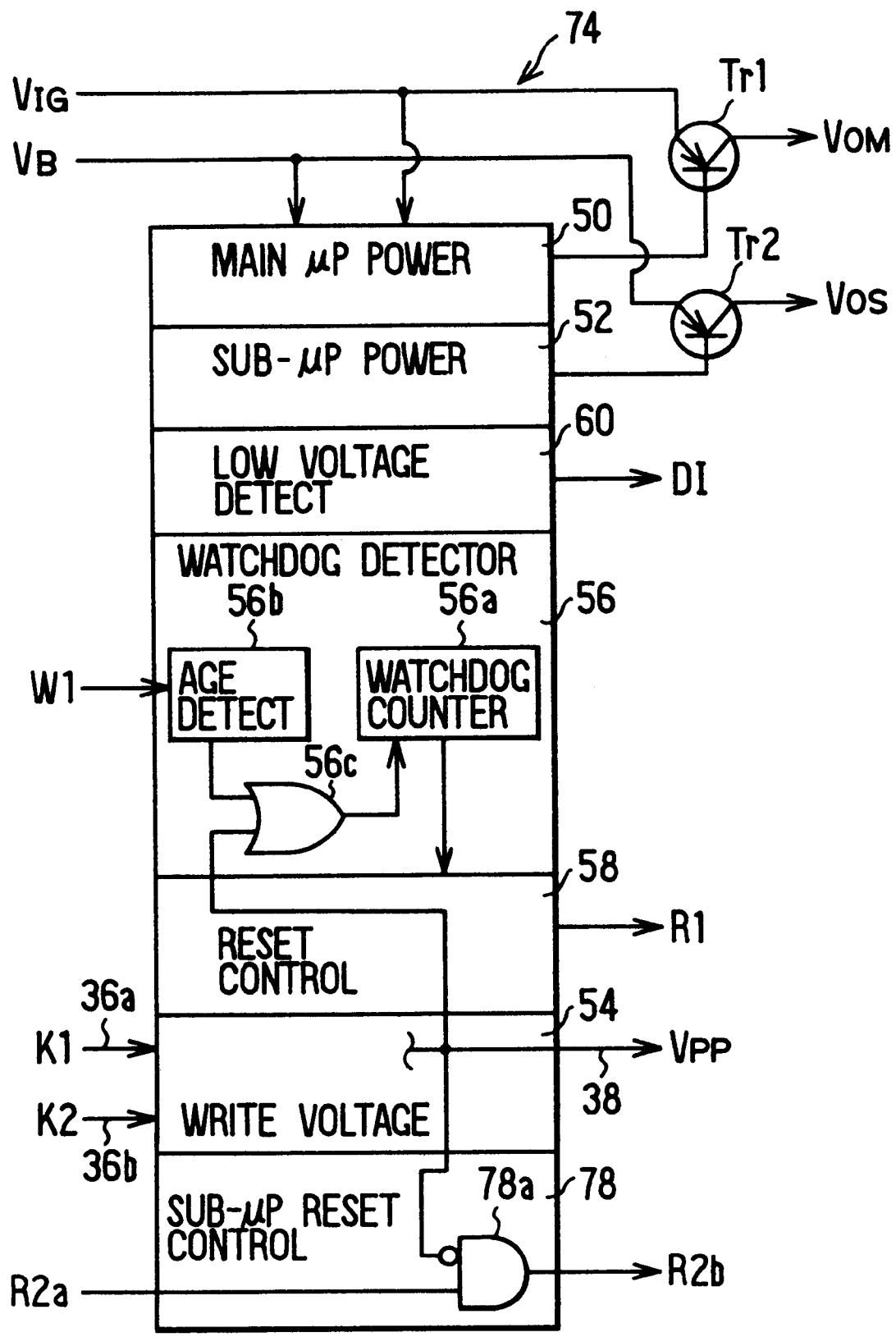
FIG. 9 is a schematic view showing the construction of a power supply circuit shown in FIG. 8.

Along with this, as shown in FIG. 9, in addition to the constitution of the power supply circuit 34 of the first preferred embodiment, the power supply circuit 74 has a sub-microprocessor reset control part 78.

This added sub-microprocessor reset control part 78 includes an AND circuit 78a which inputs the reset signal R2a from the main microprocessor 18 and the loading voltage VPP from the loading voltage generating part 54, and when the loading voltage VPP is not being outputted from the loading voltage generating part 54 outputs the reset signal R2a unchanged to the sub-microprocessor 26 as the reset signal R2bm and when the loading voltage VPP is being outputted from the loading voltage generating part 54 holds the reset signal R2b sent to the sub-microprocessor 26 at a low level (a passive level) irrespective of the signal level of the reset signal R2a.

Consequently, if the loading voltage VPP is not being outputted from the loading voltage generating part 54, when a high-level reset signal R2a is outputted from the main microprocessor 18, the sub-microprocessor 26 is reset by the reset signal R2b, but if the loading voltage VPP is not being outputted from the loading voltage generating part 54, because the reset signal R2b sent to the sub-microprocessor 26 is held at a low level (in other words, the reset signal R2a outputted from the main microprocessor 18 is prevented from being inputted into the sub-microprocessor 26) by the AND circuit 78a, resetting of the sub-microprocessor 26 by the main microprocessor 18 is prevented.

The AND circuit 78a, like the reset control part 58, also has the function of raising the reset signal R2b sent to the sub-microprocessor 26 to a high level to cause the sub-microprocessor 26 to operate from its initial state when the ignition switch IGS is turned on and the operating voltage VOM of the microprocessors 18, 26 rises.

Thus, in the ECU 62 of this second preferred embodiment, when a failure occurs in the main microprocessor 18, by means of the watchdog detecting part 56 and the reset control part 58 of the power supply circuit 74 the main microprocessor 18 only is reset, and when a failure occurs in the sub-microprocessor 26, the sub-microprocessor 26 only is reset by the main microprocessor 18. When the loading voltage VPP is being outputted from the loading voltage generating part 54, the AND circuit 78a constituting the sub-microprocessor reset control part 78 prevents the reset signal R2a outputted from the main microprocessor 18 from being inputted into the sub-microprocessor 26 and thereby fulfills the role of monitoring operation blocking means.

As a result, with the ECU 62 of this second preferred embodiment also, while the sub-microprocessor 26 is conducting a loading process for loading data into its flash memory 42, the sub-microprocessor 26 being reset by the monitoring operation of the main microprocessor 18 is prevented.

Therefore, with the ECU 62 of this second preferred embodiment also, after installing the microprocessors 18, 26, even when a loading sequence is employed wherein a control program and control data are newly loaded into the flash memory 42 of the main microprocessor 18 first and then after that a control program and control data are newly loaded into the flash memory 42 of the sub-microprocessor 26, which is the monitored side, the sub-microprocessor 26 in the middle of conducting a loading process is not reset by the operation of the main microprocessor 18 that is the monitoring side, and both the main microprocessor 18 monitoring the operation of the sub-microprocessor 26 and the ability to carry out on-board loading of control programs into the microprocessors 18, 26 can be realized at the same time with certainty.

Third Preferred Embodiment

In a memory reloading system of a third preferred embodiment, the ECU differs from the ECU 62 of the second preferred embodiment described above in the point discussed below. Parts the same as parts in the first and second preferred embodiments have been given the same reference numerals as in those preferred embodiments and will not be described in detail in the following.

Figure 11:
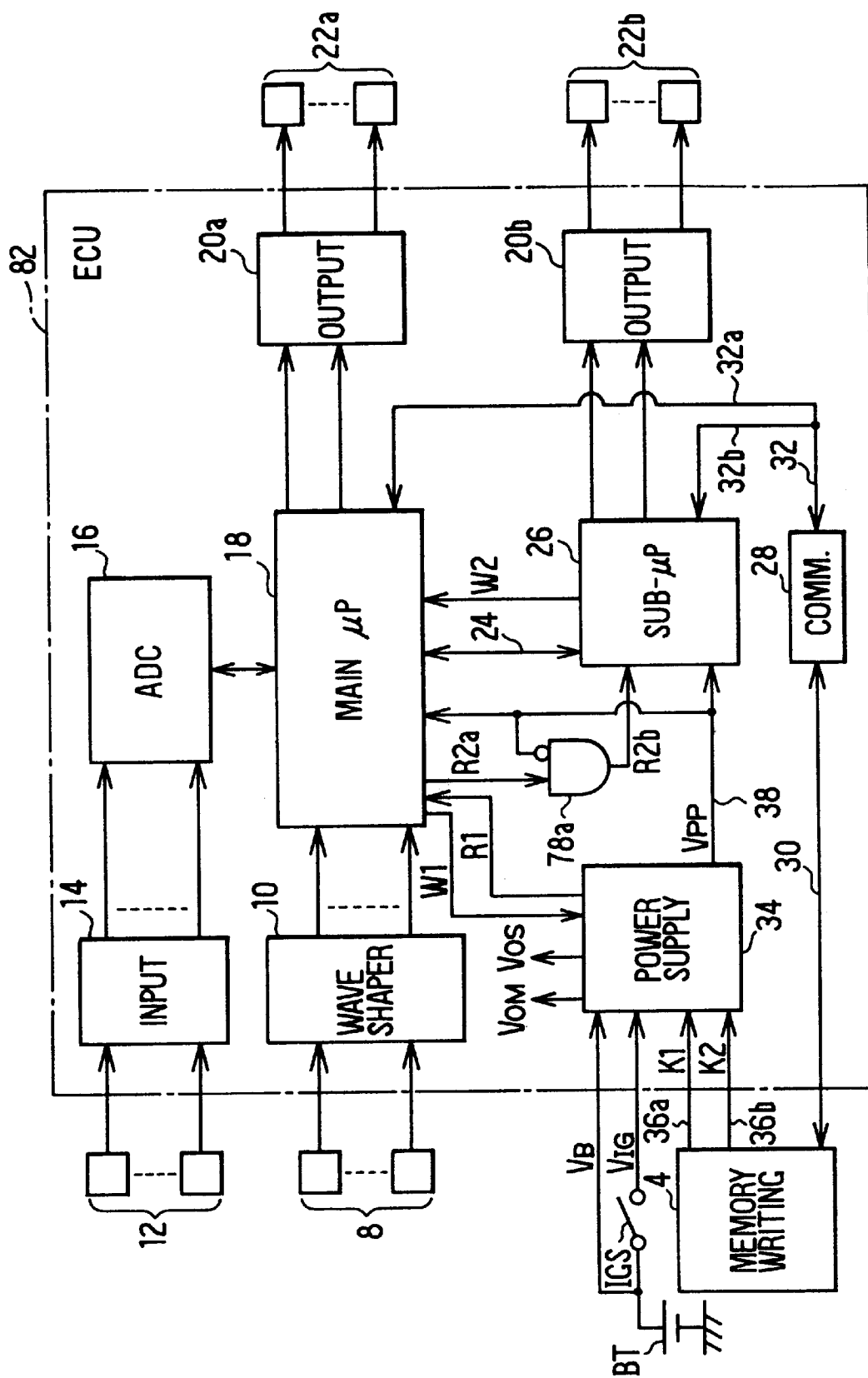
FIG. 11 is a block diagram showing the overall construction of a memory reloading system of an electronic control unit according to a third preferred embodiment of the invention.

Whereas the ECU 62 of the second preferred embodiment has the power supply circuit 74 made by adding the AND circuit 78a to the power supply circuit 34 of the first preferred embodiment (in other words, whereas the AND circuit 78a was provided inside the power supply circuit 74), in the ECU 82 of this third preferred embodiment the AND circuit 78a is provided outside the power supply circuit 34, as shown in FIG. 11.

With the ECU 82 of this third preferred embodiment also, it is possible to obtain exactly the same effects as those of the second preferred embodiment. Also, with this kind of ECU 82, there is the merit that even if due to a specification change or a difference in vehicle type the number of microprocessors becomes three or more, the mere addition of a circuit which is the same as the AND circuit 78a can meet the situation and it is not necessary to change the power supply circuit 34.

Fourth Preferred Embodiment

Whereas in the second and third preferred embodiments the reset signal R2a outputted from the main microprocessor 18 being inputted into the sub-microprocessor 26 is prevented by the AND circuit 78a, alternatively a construction may be adopted wherein the main microprocessor 18 detects that a loading process is being executed by the sub-microprocessor 26 and stops the output of a reset signal to the sub-microprocessor 26.

Figure 12:
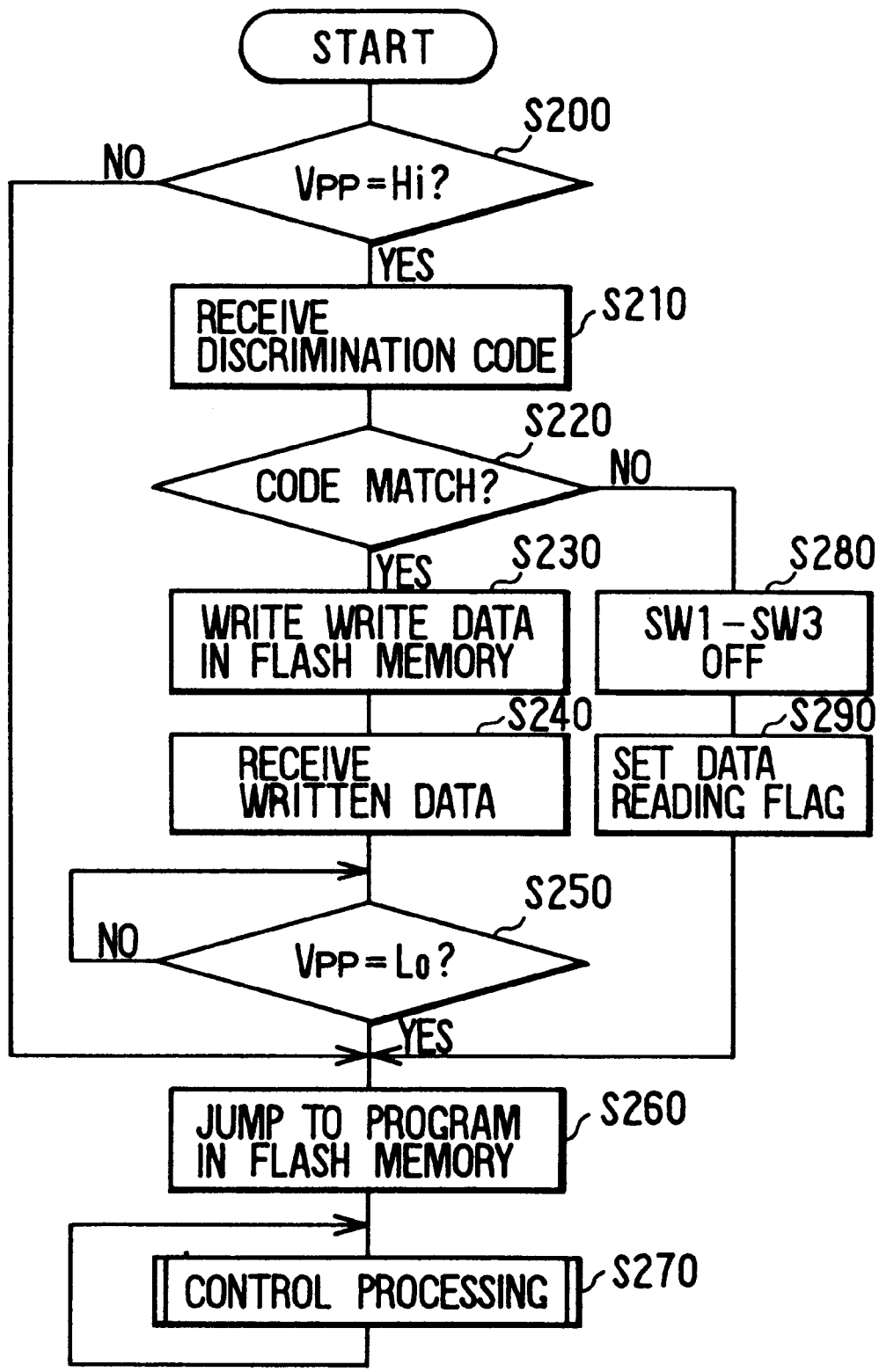
FIG. 12 is a flowchart illustrating a fourth preferred embodiment of the present invention.

Specifically, as shown in FIG. 12, this can be realized by a construction wherein when in the main microprocessor 18 it is determined in S220 of the boot program that the identification code from the memory loading unit 4 and the identification code of the main microprocessor 18 do not match, after the switch devices SW1 through SW3 are turned off in S280, in an additional step S290, a flag indicating that the sub-microprocessor 26 is in the process of data loading is set, and that flag is referred to in the sub-microprocessor monitoring process of FIG. 10 and if the flag has been set then the output of the reset signal R2a to the sub-microprocessor 26 is prohibited.

This output-prohibited state can then be canceled when the ignition switch IGS is next turned on again and the main microprocessor 18 starts to operate from its initial state. That is, if this is done, the normal state wherein the operation of the sub-microprocessor 26 can be monitored can be restored by turning on the ignition switch IGS again after data loading into the sub-microprocessor 26 is completed.

Although in all the preferred embodiments described above each of the microprocessors 18, 26 has a flash memory (flash EEPROM) 42 as a nonvolatile memory electrically reloadable with data, this may alternatively be an EEPROM or other memory.

Fifth Preferred Embodiment

A fifth preferred embodiment of the present invention has a structure similar to that of the system shown in FIG. 1, and differs mainly in the structure of the power supply circuit 34 as will be described in detail with reference to FIG. 1.

In this preferred embodiment, as described above, the sub-microprocessor 26 periodically outputs a pulse signal W2 to the main microprocessor 18 as it executes its program and the main microprocessor 18 outputs a low-active reset signal R2 to the sub-microprocessor 26 when this pulse signal W2 from the sub-microprocessor 26 is continuously not inputted for a predetermined time. In other words, the main microprocessor 18 monitors whether or not the sub-microprocessor 26 is operating normally.

Also, the signal level of the reset signal R2 is forced to a low level when the main microprocessor 18 is in the process of resetting, and consequently, if the reset signal R1 is outputted from the reset control part 58 to the main microprocessor 18, the sub-microprocessor 26 is also reset together with the main microprocessor 18.

When on starting to execute the boot program, the CPU 40 of either of the microprocessors 18, 26 determines that the ECU is in the loading mode, as will be further discussed later, without immediately calling the control program in the flash memory 42, the CPU 40 continues the execution of the boot program and thereby carries out a loading process for rewriting the current data stored in the flash memory 42 with load data (data constituting a new control program and control data) transmitted from the memory loading unit 4. After this loading processing ends, the CPU 40 calls the new control program loaded into the flash memory 42 and carries out control processing for controlling the engine or the automatic transmission.

The memory loading unit 4 is constructed around an ordinary microprocessor having a CPU, ROM, RAM and so on, and is connected to the ECU 2 as an external device by way of a connector (not shown). When so connected, the memory loading unit 4 is thereby connected to the serial communication line 30 of the ECU 2 and to the two signal lines 36a, 36b extending from the power supply circuit 34 (from the loading voltage generating part 54).

Also, although it is not shown in the drawings, the memory loading unit 4 has a starting switch for operating the unit and a selection switch for selecting which of the flash memories 42 of the main microprocessor 18 and the sub-microprocessor 26 is to have its data (control program and control data) reloaded, and also has a storage medium such as a ROM or a floppy disc in which is stored load data (data constituting a new control program and control data), which is the data to be reloaded, to be transmitted to the ECU 2 and a display part for displaying various messages.

At the head of the load data stored in this storage medium is disposed the identification code of the microprocessor (either the main microprocessor 18 or the sub-microprocessor 26) into which that load data is to be loaded.

Figure 13:
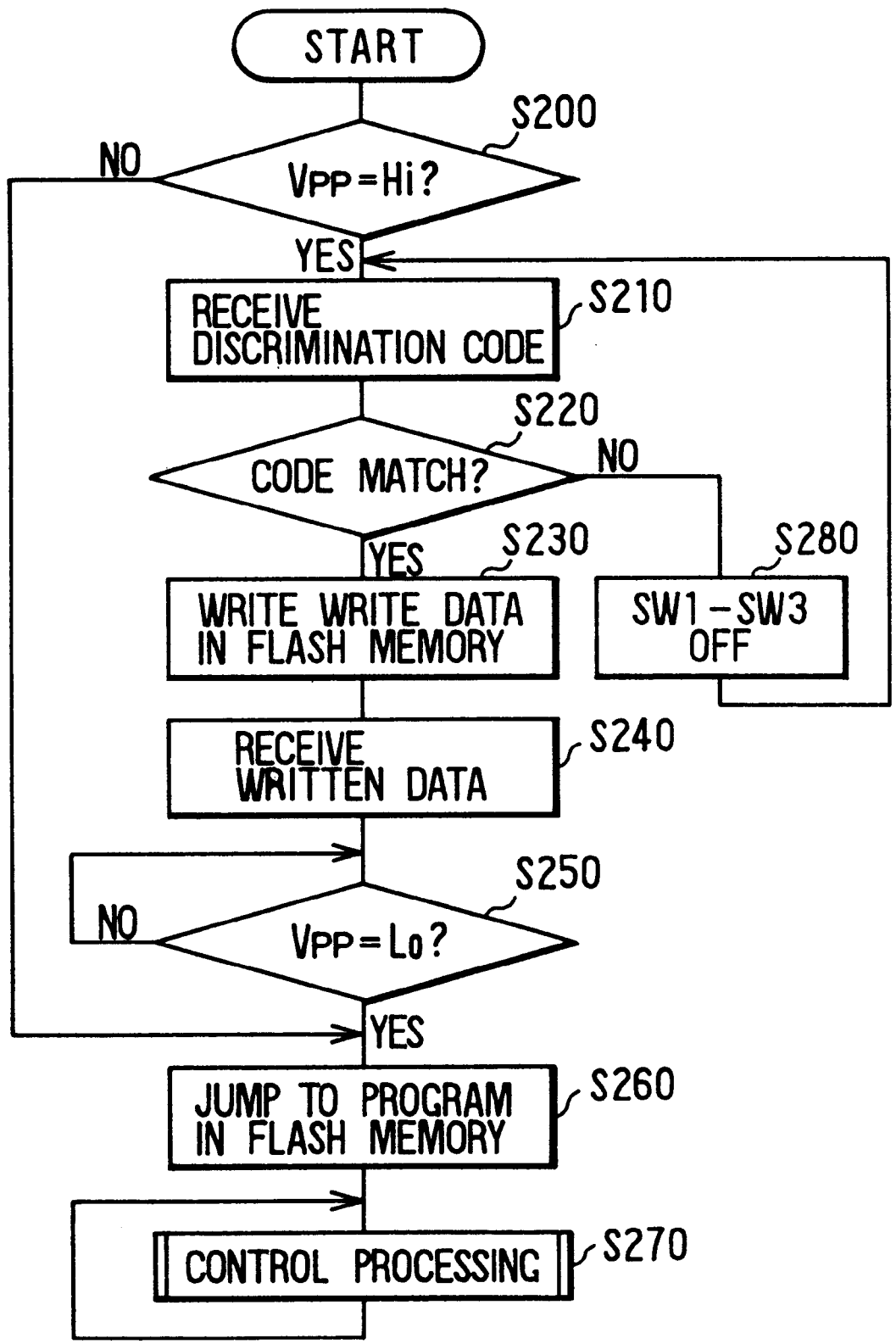
FIG. 13 is a flowchart showing processing executed by the main microprocessor and by the sub-microprocessor in a fifth embodiment.

Next, using the flowchart of FIG. 13, processing executed by the two microprocessors 18, 26 of the ECU 2 in the memory reloading system of this fifth preferred embodiment of the invention will be described. FIG. 13 is a flowchart showing processing executed by each of the microprocessors 18, 26, wherein the processing of steps (hereinafter denoted simply with the letter S) from S200 to S260 is executed by the boot program in the mask ROM 44 and the processing of S270 is executed by the control program in the flash memory 42.

In the memory reloading system of this fifth preferred embodiment, for example when a control program and control data stored in the main microprocessor 18 of the ECU 2 are to be reloaded, an operator first stores load data including "0001" corresponding to the main microprocessor 18 as an identification code into the storage medium of the memory loading unit 4. The memory loading unit 4 is then connected to the ECU 2 and by means of the selection switch of the memory loading unit 4 the main microprocessor 18 is selected as the object of reloading and after that the starting switch of the memory loading unit 4 is turned on and the ignition switch IGS of the vehicle is turned on and the ECU 2 is thereby made to start operating from its initial state.

When this is done, because the loading permission signal K1 is outputted from the memory loading unit 4 to the ECU 2 through the signal line 36a (S100), as the ignition switch IGS is turned on, on the ECU 2 side, the loading voltage VPP is supplied from the power supply circuit 34 to the two microprocessors 18, 26 through the power supply line 38.

The load data stored in the storage medium is then transmitted from the memory loading unit 4 to the ECU 2 (S110) and on the ECU 2 side each of the two microprocessors 18, 26 receives the identification code disposed at the head of the load data from the memory loading unit 4 through the serial communication line 30, the communication circuit 28 and the serial communication line 32 (S200: YES, S210) and compares that received identification code with the identification code held in its own flash memory 42 (S220).

When this happens, in the sub-microprocessor 26, the two identification codes do not match (S220: NO) and as a result the switch devices SW1 through SW3 all become Off and the electrical connection between the sub-microprocessor 26 and the serial communication line 32 and the power supply line 38 is thereby broken (S280).

In the main microprocessor 18, on the other hand, the two identification codes do match (S220: YES), this main microprocessor 18 alone receives all the load data from the memory loading unit 4, and that received data is loaded together with the identification code received before it into its flash memory 42 (S230) as an update.

After that, the data thus loaded into the flash memory 42 of the main microprocessor 18 is transmitted back from the main microprocessor 18 to the memory loading unit 4 by way of the serial communication line 32, the communication circuit 28 and the serial communication line 30 (S240), and in the memory loading unit 4 the data from the main microprocessor 18 is verified by being compared with the master load data held in the storage medium (S130). If the result of this verification is good (S140: YES), the loading permission signal K1 that had been being outputted from the memory loading unit 4 returns to a low level (S150), and along with this, on the ECU 2 side, the supply of the loading voltage VPP to the two microprocessors 18, 26 stops.

At this state, the reloading of a control program and control data into the main microprocessor 18 ends.

To reload a control program and control data stored in the sub-microprocessor 26, the same process is carried out except that the load data including the identification code "0010" of the sub-microprocessor 26 is stored in the storage medium of the memory loading unit 4 and the sub-microprocessor 26 as the object of reloading is selected by means of the selection switch of the memory loading unit 4.

In this fifth preferred embodiment, the processing of S220 in FIG. 13 is equivalent to determining means provided by the invention, and the processing of S280 in FIG. 13 is equivalent to transmission prohibiting means. The function of communication operation controlling means is realized by the processing of the above-mentioned S220 and S280 being executed by the two microprocessors 18, 26, and in this fifth preferred embodiment the flash memory 42 is used as identification information storing means.

As described above in detail, in the ECU 2 of this fifth preferred embodiment, the main microprocessor 18 and the sub-microprocessor 26, each having a flash memory 42 electrically reloadable with data, both commonly use a single serial communication line 30, 32 to carry out serial data communication with the memory loading unit 4.

Further, in each of the two microprocessors 18, 26, when starting to operate from a reset state when the ignition switch IGS is turned on, if the loading voltage VPP is being supplied from the power supply circuit 34 and also the identification code transmitted from the memory loading unit 4 and the own identification code match, the microprocessor 18 or 26 executes a load process (S230) where it receives load data from the memory loading unit 4 and loads it into its flash memory 42 as an update, and in particular, in each of the two microprocessors 18, 26, when the identification code from the memory loading unit 4 and the identification code do not match, the microprocessor 18 or 26 infers that a microprocessor other than itself is executing a loading process for data reloading and switches off the switch devices SW1 and SW2 inside it and thereby forcibly prohibits itself from communicating with the serial communication line 32.

Thus, when either of the two microprocessors 18, 26 is executing a loading process for data reloading, the other microprocessor is prohibited from transmitting data to the serial communication line 32, and as a result the data received by the microprocessor that is the object of data reloading being destroyed by data transmitted by the other microprocessor is prevented.

Therefore, with the ECU 2 of this fifth preferred embodiment, notwithstanding that it has a simple construction wherein the two microprocessors 18, 26 both use the same single serial communication line 30, 32, a control program and control data stored in the flash memory 42 of either of the microprocessors 18, 26 can be reloaded with certainty. Furthermore, with this fifth preferred embodiment, this effect can be obtained without providing any special hardware.

Also, with the ECU 2 of this fifth preferred embodiment, because by means of the identification code transmitted through the serial communication line 30 to the ECU 2 it is possible to specify the microprocessor that is the object of data reloading and reload the control program and control data stored in the flash memory 42 thereof with certainty, even if the number of microprocessors in the ECU 2 increases to three or more, it is possible to handle them easily without adding any special circuits.

Also, in this fifth preferred embodiment, because each of the microprocessors 18, 26 is provided with switch devices SW1, SW2 for connecting it to and disconnecting it from the serial communication line 32 and prohibits its own communication with the serial communication line 32 by turning off these switch devices SW1, SW2, when either of the microprocessors is executing a loading process the other microprocessor can be certainly prohibited from communicating with the serial communication line 32.

Also, with this fifth preferred embodiment, because by means of the switch device SW3 the connection between the microprocessor 18, 26 that is not the object of reloading and the power supply line 38 is also broken, it is possible to certainly prevent data being accidentally loaded into the flash memory 42 that is not the object of data reloading.

Although in this fifth preferred embodiment the three switch devices SW1 through SW3 are provided in each of the microprocessors 18, 26, alternatively the switch device SW1 alone may be provided and just the electrical path along which the microprocessor 18, 26 transmits data to the serial communication line 32 broken.

Also, although in the ECU 2 of the fifth preferred embodiment described above the identification code was stored in the flash memory 42, the identification code may alternatively be stored in another nonvolatile memory (for example the mask ROM 44) inside the microprocessor 18, 26. Alternatively, instead of an identification code being stored in the form of data, an identification code may be assigned to each of the microprocessors 18, 26 by a predetermined input port of the microprocessor 18, 26 being pulled high or pulled low. In this case, in S220 of FIG. 13, the microprocessor can find out its own identification code by reading the input level of that input port.

Sixth Preferred Embodiment

Whereas in the ECU 2 of the fifth preferred embodiment, the microprocessor to be the object of data reloading is specified by means of an identification code from the memory loading unit 4, alternatively a construction may be employed wherein the loading voltage VPP is only supplied to the microprocessor to be the object of data reloading.

For this, in a memory reloading system of the sixth preferred embodiment described next, the ECU differs from the ECU 2 of the fifth preferred embodiment described above in points (1) through (4) below. The memory loading unit 4 is the same as that of the fifth preferred embodiment. In this sixth preferred embodiment, parts the same as parts of the fifth preferred embodiment have been given the same reference numerals as in the fifth preferred embodiment and will not be described in detail in the following.

Figure 14:
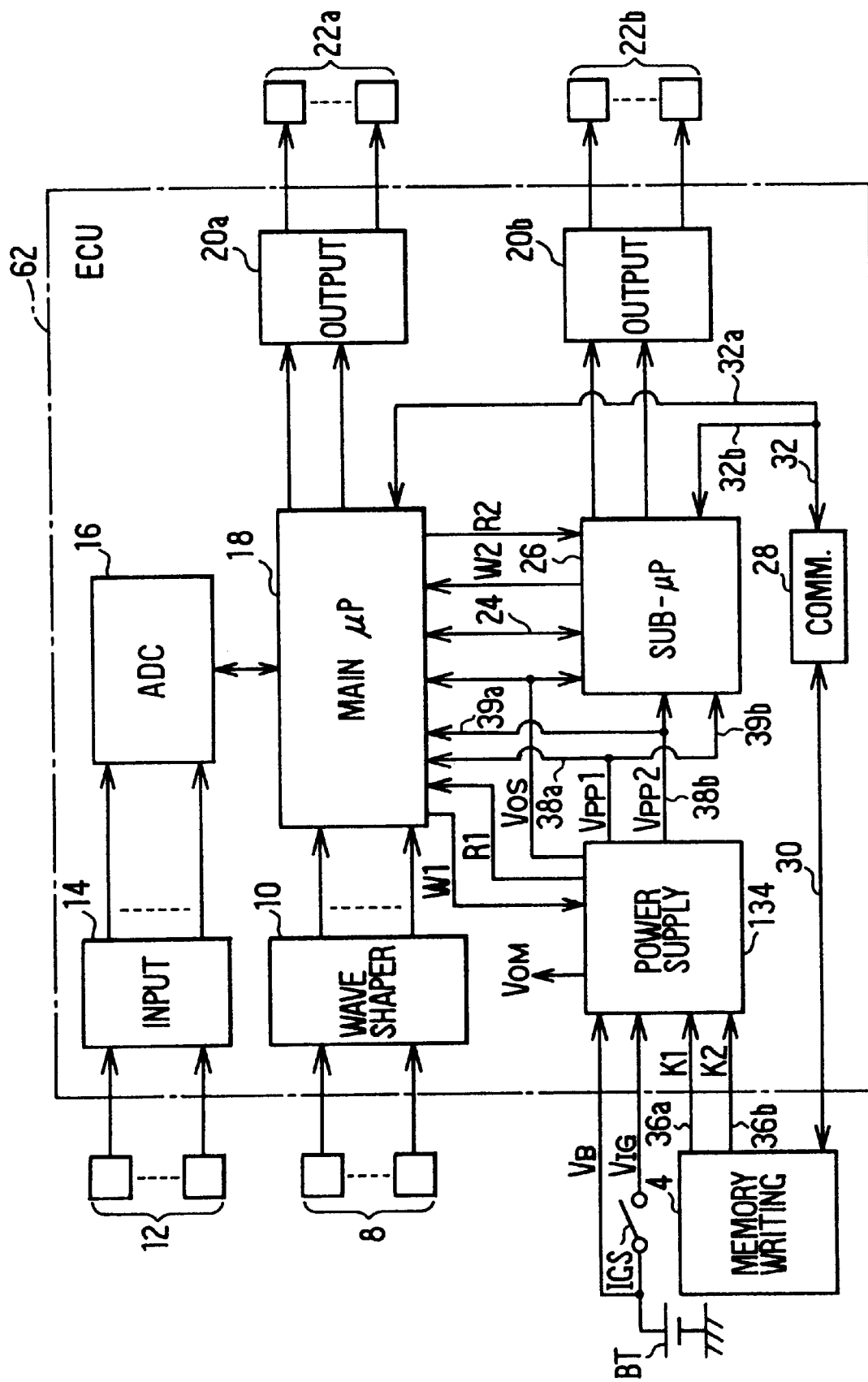
FIG. 14 is a block diagram showing the overall construction of a memory reloading system of an electronic control unit according to a sixth preferred embodiment of the invention.
Figure 15:
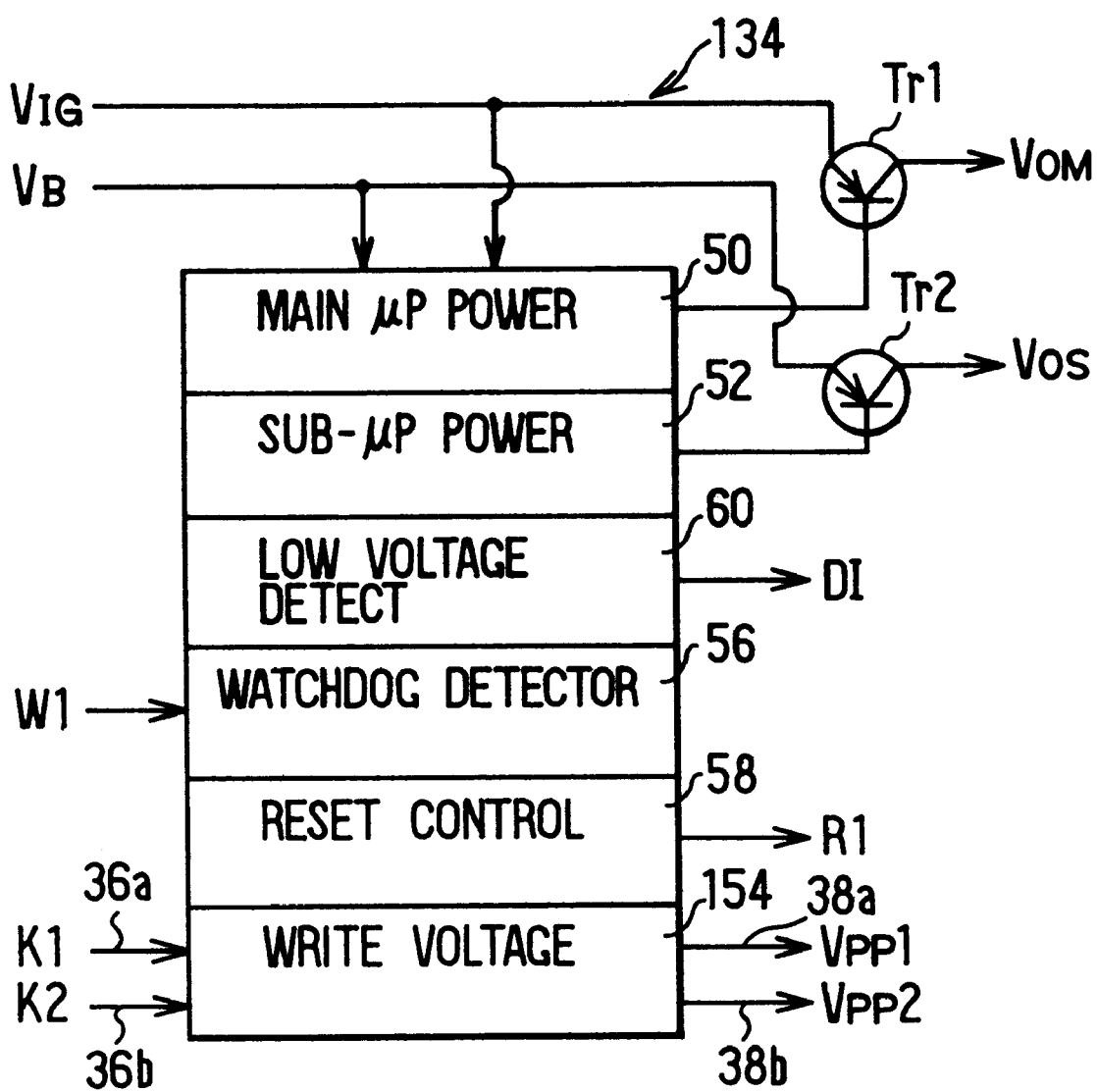
FIG. 15 is a schematic view showing the construction of a power supply circuit shown in FIG. 14.

(1) First, as shown in FIG. 14, in the ECU 62 of this sixth preferred embodiment, instead of the power supply circuit 34 of the fifth preferred embodiment there is provided a power supply circuit 134, shown in FIG. 15, and a loading voltage VPP1 necessary when reloading data into the flash memory 42 in the main microprocessor 18 is supplied through a power supply line 38a to the main microprocessor 18 from a loading voltage generating part 154 of this power supply circuit 134 and a loading voltage VPP2 necessary when reloading data into the flash memory 42 in the sub-microprocessor 26 is supplied through a power supply line 38b to the sub-microprocessor 26 from the loading voltage generating part 154 of the power supply circuit 134.

That is, the main microprocessor 18 and the sub-microprocessor 26 are respectively independently supplied with the loading voltages VPP1, VPP2 from the power supply circuit 134 through the power supply lines 38a, 38b. The loading voltages VPP1, VPP2 respectively supplied to the microprocessors 18, 26 are both 7.5 V as in the case of the first preferred embodiment.

Also, in the ECU 62 of this second preferred embodiment, a monitor line 39a which is a signal line branching from the power supply line 38b for monitoring that the loading voltage VPP2 is being supplied from the power supply circuit 134 to the sub-microprocessor 26 is connected to the main microprocessor 18, and similarly a monitor line 39b which is a signal line branching from the power supply line 38a for monitoring that the loading voltage VPP1 is being supplied from the power supply circuit 134 to the main microprocessor 18 is connected to the sub-microprocessor 26.

Here, in the power supply circuit 134, only the loading voltage generating part 154 is different from the power supply circuit 34 of the first preferred embodiment. This loading voltage generating part 154 outputs the loading voltage VPP1 to the power supply line 38a (and hence to the main microprocessor 18) when as a result of the processing of S100 of FIG. 4, the loading permission signal K1 has been outputted from the memory loading unit 4 and outputs the loading voltage VPP2 to the power supply line 38b (and hence to the sub-microprocessor 26) when as a result of the processing of S100 the loading permission signal K2 has been outputted from the memory loading unit 4.

Figure 16:
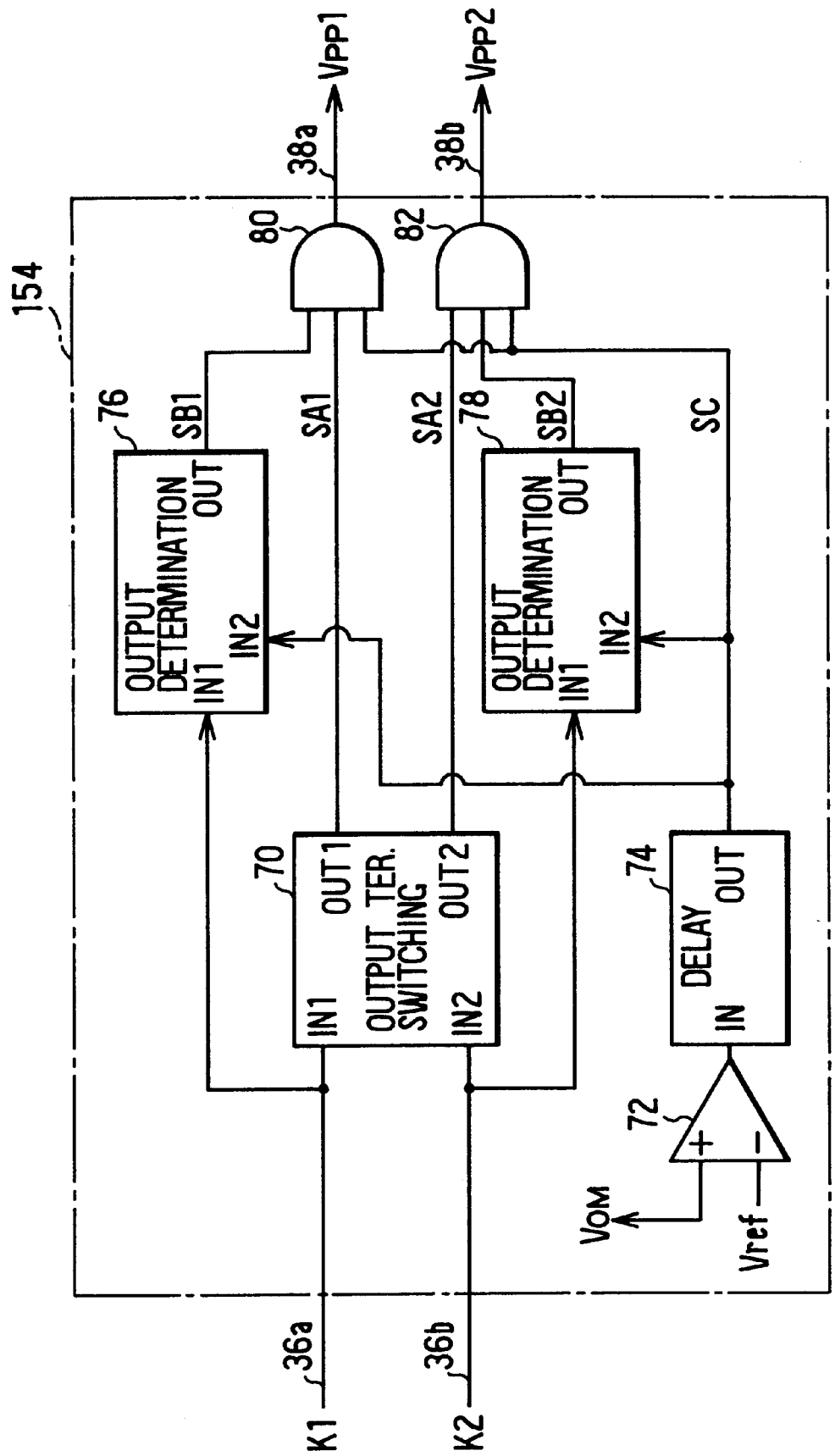
FIG. 16 is a block diagram showing the internal construction of a loading voltage generating part shown in FIG. 15.

More specifically, as shown in FIG. 16, the loading voltage generating part 154 is made up of an output terminal switching circuit 70 which has two input terminals IN1, IN2 connected to the signal lines 36a, 36b respectively and while the voltage level of only the signal line 36a is high outputs a high-active signal SA1 from an output terminal OUT1 and while the voltage level of only the signal line 36b is high outputs a high-active signal SA2 from another output terminal OUT2, a comparator 72 which outputs a high-active signal when the operating voltage VOM outputted from the above-mentioned transistor Tr1 to the microprocessors 18, 26 as the ignition switch IGS is turned on exceeds a predetermined reference voltage Vref (for example 4.75 V), and a delay circuit 74 which outputs the output signal of the comparator 72 while delaying only the rise thereof for a predetermined delay time td.

The loading voltage generating part 154 also has an output condition determining circuit 76 which has one input terminal IN1 connected to the signal line 36a and has the output signal SC of the delay circuit 74 inputted into another input terminal IN2 and from when the output signal SC of the delay circuit 74 first changes to a high level after the voltage level of the signal line 36a becomes high outputs a high-active signal SB1 from an output terminal OUT while both the voltage of the signal line 36a and the output signal SC are high thereafter and an output condition determining circuit 78 which has one input terminal IN1 connected to the signal line 36b and has the output signal SC of the delay circuit 74 inputted into another input terminal IN2 and from when the output signal SC of the delay circuit 74 first changes to a high level after the voltage level of the signal line 36b becomes high outputs a high-active signal SB2 from an output terminal OUT while both the voltage of the signal line 36b and the output signal SC are high thereafter.

The loading voltage generating part 154 also has an AND circuit 80 which outputs the loading voltage VPP1 to the power supply line 38a when the output signal SA1 of the output terminal switching circuit 70 and the output signal SB1 of the output condition determining circuit 76 and the output signal SC of the delay circuit 74 are all high-level and an AND circuit 82 which outputs the loading voltage VPP2 to the power supply line 38b when the output signal SA2 of the output terminal switching circuit 70 and the output signal SB2 of the output condition determining circuit 78 and the output signal SC of the delay circuit 74 are all at a high level.

In this loading voltage generating part 154, as shown in FIGS. 17A–17F, for example, when the active-high loading permission signal K1 is outputted from the memory loading unit 4 to the signal line 36a, the high-level output signal SA1 is outputted from the output terminal OUT1 of the output terminal switching circuit 70. Also, after the high-active loading permission signal K1 is thus outputted from the memory loading unit 4, when the ignition switch IGS has been turned on and the operating voltage VOM to the microprocessors 18, 26 has risen and also the predetermined delay time td has elapsed thereafter the output signal SC of the delay circuit 74 becomes high-level and along with this the output signal SB1 is outputted from the output terminal OUT of the output condition determining circuit 76.

When this happens, the loading voltage VPP1 is outputted from the AND circuit 80 through the power supply line 38a to the main microprocessor 18.

After that, when the high-active loading permission signal K1 from the memory loading unit 4 returns to a low level as a result of the processing of S150 of FIG. 4, the signal SA1 from the output terminal switching circuit 70 and the signal SB2 from the output condition determining circuit 76 become low-level and the outputting of the loading voltage VPP1 from the AND circuit 80 is stopped. Also, although it is not shown in FIGS. 17A–17F, even if the loading permission signal K1 is still at a high level, when the ignition switch IGS is turned off and the operating voltage VOM becomes lower than the reference voltage Vref of the comparator 72, since the output signal SC of the delay circuit 74 becomes low-level, the outputting of the loading voltage VPP1 from the AND circuit 80 is stopped.

As shown in parentheses in FIGS. 17A–17F, when the high-active loading permission signal K2 is outputted from the memory loading unit 4 to the signal line 36b, the high-level signal SA2 is outputted from the output terminal OUT2 of the output terminal switching circuit 70 and after that, along with the ignition switch IGS being turned on the high-level signal SB2 is outputted from the output terminal OUT of the output condition determining circuit 78 and the loading voltage VPP2 is outputted from the AND circuit 82 through the power supply line 38b to the sub-microprocessor 26.

Thus, the loading voltage generating part 154 outputs the loading voltage VPP1 to the power supply line 38a on the main microprocessor 18 side when the loading permission signal K1 corresponding to the main microprocessor 18 has been outputted from the memory loading unit 4 and after, that along with the ignition switch IGS being turned on, the operating voltage VOM has been supplied to the microprocessors 18, 26 and the predetermined delay time td has elapsed, and outputs the loading voltage VPP2 to the power supply line 38b of the sub-microprocessor 26 side when the loading permission signal K2 corresponding to the sub-microprocessor 26 has been outputted from the memory loading unit 4 and after that, along with the ignition switch IGS being turned on, the operating voltage VOM has been supplied to the microprocessors 18, 26 and the predetermined delay time td has elapsed.

The delay time td of the delay circuit 74 is set to be longer than the time taken for the IG voltage VIG supplied to the power supply circuit 134 to stabilize after the ignition switch IGS is turned on and shorter than the time taken for the resetting of the microprocessors 18, 26 to be terminated after the ignition switch IGS is turned on. By means of this time setting, the loading voltages VPP1, VPP2 can be supplied to the respective microprocessors 18, 26 stably at all times.

Also, as described above, the output condition determining circuits 76, 78 are constructed to output the high-active signals SB1, SB2 from their output terminals OUT when the output signal SC of the delay circuit 74 first changes to a high level after the voltage level of the corresponding signal line 36a or 36b becomes high-level.

Consequently, for example as shown with dashed lines in FIGS. 17A–17F, even if with the ignition switch IGS On the voltage level of the signal line 36a or 36b changes to a high level due to an influence such as noise after the loading permission signal K1 or K2 from the memory loading unit 4 has returned to a low level from a high level, the high-level signal SB1 or SB2 is not outputted from the output terminal OUT of the output condition determining circuit 76 or 78 and as a result the loading voltage VPP1 or VPP2 is not outputted from the AND circuit 80 or 82.

Thus, if the supply of the loading voltage VPP1, VPP2 to one or the other of the two microprocessors 18, 26 is temporarily stopped, unless the ignition switch IGS is turned on again to resupply the IG voltage VIG to the ECU 62 the loading voltages VPP1, VPP2 are not supplied, and by this means it is possible to eliminate the possibility of the content written in the flash memory 42 of either of the microprocessors 18, 26 being reloaded at an inappropriate time.

(2) In the ECU 62 of this sixth preferred embodiment, no identification code is stored in the flash memory 42 of either of the microprocessors 18, 26, and also no identification code is stored in the above-mentioned storage medium of the memory loading unit 4 either. In other words, in S110 of FIG. 4, the memory loading unit 4 transmits only data constituting a control program and control data for controlling the engine or the automatic transmission to the ECU 62 as load data.

(3) In the ECU 62 of this sixth preferred embodiment, when the CPU 40 of either of the microprocessors 18, 26 determines in S200 of FIG. 13 that the loading voltage VPP1 or VPP2 is being supplied to it from the power supply circuit 134 through the respective power supply line (the power supply line 38a in the case of the main microprocessor 18 and the power supply line 38b in the case of the sub-microprocessor 26), it proceeds directly to S230 without executing the processing of S210, S220 and S280 of FIG. 13 and receives load data transmitted from the memory loading unit 4 according to the processing of S110 and loads that received load data into its flash memory 42 as an update.

Figures 17B, 17C, 17D, 17E, 17F, 18:
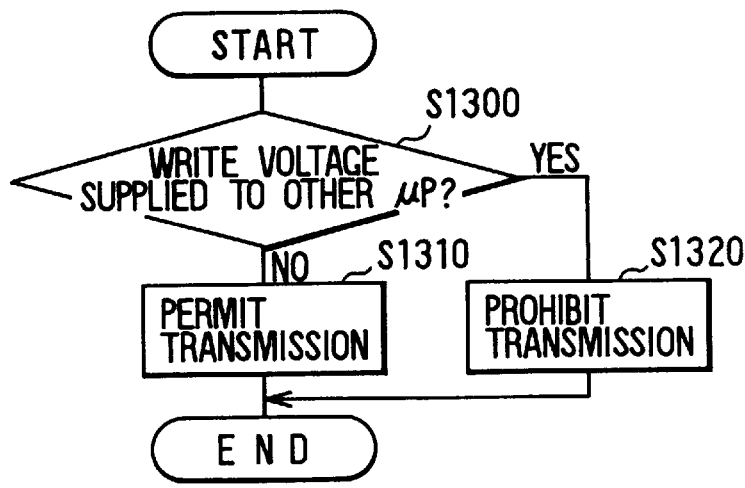

(4) Also, in the ECU 62 of this sixth preferred embodiment, the CPU 40 of each of the microprocessors 18, 26, after jumping to the control program in the flash memory 42 in S260 of FIG. 13, executes the transmission control process shown in FIG. 18 at predetermined intervals, in parallel with the control processing of S270 of FIG. 13. The program of this transmission control process is stored in the flash memory 42 of each of the microprocessors 18, 26 as a part of the control program for controlling the engine or the automatic transmission.

That is, in this second preferred embodiment, after jumping to the control program in the flash memory 42, when a predetermined condition is established, either of the microprocessors 18, 26 may carry out serial data communication by way of the serial communication line 30, the communication circuit 28 and the serial communication line 32 with an external device other than the memory loading unit 4, and the transmission control process shown in FIG. 18 is a process executed to permit or prohibit the execution of a program for transmission processing provided for carrying out data transmission to that external device other than the memory loading unit 4.

As shown in FIG. 18, when starting to execute this transmission control process, in a first step S1300, by reading the voltage level of the monitor line 39a or 39b connected to it, the CPU 40 of the microprocessor 18, 26 determines whether or not the loading voltage VPP1 or VPP2 is being supplied to the other microprocessor. More specifically, in the case of the main microprocessor 18 the CPU 40 thereof determines on the basis of the voltage level of the monitor line 39a whether or not the loading voltage VPP2 is being supplied to the sub-microprocessor 26 and in the case of the sub-microprocessor 26 the CPU 40 thereof determines on the basis of the voltage level of the monitor line 39b whether or not the loading voltage VPP1 is being supplied to the main microprocessor 18.

Then, when in this S1300 it determines that the loading voltage VPP1 or VPP2 is not being supplied to the other microprocessor, the CPU 40 proceeds to S1310 and permits the execution of the above-mentioned program for transmission processing before ending the present transmission control process.

When on the other hand in the above-mentioned S1300 it determines that the loading voltage VPP1, VPP2 is being supplied to the other microprocessor, it infers that another microprocessor is executing the loading process of S230 in FIG. 13 and shifts to S1320. In this S1320 it prohibits execution of the above-mentioned program for transmission processing and thereby prohibits the transmission of data from its own microprocessor to the serial communication line 32, after which that transmission control process ends.

In the ECU 62 of the sixth preferred embodiment described above, for example, when a control program and control data stored in the flash memory 42 of the main microprocessor 18 are to be reloaded, an operator first stores load data for the main microprocessor 18 in the storage medium of the memory loading unit 4. Then, as in the case of the fifth preferred embodiment, the memory loading unit 4 is connected to the ECU 62 and the main microprocessor 18 is selected as the object of data reloading by means of the selection switch of the memory loading unit 4 and then the operating switch of the memory loading unit 4 is turned on and the ignition switch IGS is also turned on and the ECU 62 is thereby caused to operate from its initial state.

When this is done, because the loading permission signal K1 is outputted from the memory loading unit 4 to the ECU 62 through the signal line 36a (S100), as the ignition switch IGS is turned on, on the ECU 62 side, the loading voltage VPP1 is supplied from the loading voltage generating part 154 of the power supply circuit 134 through only the power supply line 38a to the main microprocessor 18.

As a result, when the load data stored in the storage medium is transmitted from the memory loading unit 4 to the ECU 62 (S110), on the ECU 62 side, only the main microprocessor 18 receives the load data from the memory loading unit 4 and loads that received data into its flash memory 42 as an update (S200: YES, S230).

In the sub-microprocessor 26, on the other hand, because the loading voltage VPP2 from the loading voltage generating part 154 of the power supply circuit 134 is not being supplied to it, the transmission control process shown in FIG. 18 is executed (S200: NO), and while the loading voltage VPP1 is being supplied to the main microprocessor 18, the sub-microprocessor 26 prohibits itself from transmitting data to the serial communication line 32 (S300: YES, S320).

To reload a control program and control data stored in the flash memory 42 of the sub-microprocessor 26, the same process is carried out except that load data for the sub-microprocessor 26 is stored in the storage medium of the memory loading unit 4 and the sub-microprocessor 26 is selected as the object of data reloading by means of the selection switch of the memory loading unit 4.

In this second preferred embodiment, the processing of S1300 in FIG. 18 is equivalent to determining means provided by the present invention in the appended claims, and the processing of S1320 in FIG. 18 is equivalent to transmission prohibiting means. Further, by the processing of S1300 and S1320 being executed by each of the microprocessors 18, 26, the function of communication operation controlling means is realized. Also, in this sixth preferred embodiment, the loading voltage generating part 154 of the power supply circuit 134 and the two power supply lines 38a, 38b are equivalent to voltage supplying means for supplying a respective voltage to each of the microprocessors 18, 26.

As described in detail above, in the ECU 62 of this sixth preferred embodiment, when the ignition switch IGS is turned on and the microprocessors 18, 26 start to operate from their reset state, if the loading voltage VPP1, VPP2 is being supplied from the power supply circuit 134, the respective microprocessor executes a loading process where it receives load data from the memory loading unit 4 and loads it into its flash memory 42 as an update, but also each of the microprocessors 18, 26 monitors by means of the monitor line 39a, 39b whether or not the loading voltage VPP1, VPP2 is being supplied to the other microprocessor, and when the loading voltage VPP1, VPP2 is being supplied to the other microprocessor, infers that another microprocessor is executing a loading process for data reloading and prohibits execution of a program for transmission processing, and thereby forcibly prohibits its own data transmission to the serial communication line 32.

Because of this, in the ECU 62 of this second preferred embodiment also, when either of the microprocessors 18, 26 is executing a loading process for data reloading, the other microprocessor is prohibited from transmitting data to the serial communication line 32 and as a result, it is possible to certainly reload a control program and control data stored in the flash memory 42 of either of the microprocessors 18, 26 notwithstanding the use of a simple construction wherein the two microprocessors 18, 26 commonly use a single serial communication line 30, 32.

Also, in the ECU 62 of this sixth preferred embodiment, because a construction is adopted wherein the execution of a program for transmission processing provided for carrying out transmission of data to the serial communication line 32 is prohibited by the microprocessors 18, 26, it is possible to simply and easily prohibit one of the microprocessors transmitting data to the serial communication line 32 when the other microprocessor is executing a loading process extremely.

Also, with the ECU 62 of this sixth preferred embodiment, because the microprocessor that is the object of data reloading is specified by the loading voltage VPP1, VPP2 being supplied to it selectively and it is not necessary for identification codes to be prestored in the microprocessors 18, 26, the manufacturability of the ECU 62 can be increased.

That is, if the two microprocessors 18, 26 are microprocessors having the same specifications, it is sufficient to install them in the ECU 62 without particularly distinguishing them from each other and then newly load data (a control program and control data) into the flash memory 42 of each of the microprocessors 18, 26 after that, and therefore in the manufacture of the ECU 62 it is possible to cut out a management process for distinguishing the respective microprocessors 18, 26.

In this sixth preferred embodiment, the loading voltage generating part 154 of the power supply circuit 134 provided inside the ECU 62 outputs a loading voltage VPP1 or VPP2 to one or the other of the microprocessors 18, 26 according to which of the loading permission signals K1, K2 is outputted from the memory loading unit 4, but alternatively the power supply lines 38a, 38b connected to the microprocessors 18, 26 may be extended to outside the ECU 62 and a loading voltage VPP1, VPP2 supplied to one or the other of those power supply lines 38a, 38b from the memory loading unit 4.

In the ECU 62 of the sixth preferred embodiment, although it is not necessary to provide the microprocessors 18, 26 with switch devices SW1 through SW3 as in the first preferred embodiment, even if such switch devices SW1 through SW3 are provided, they pose no problem as long as they are always On.

Also, in the S1320 of the transmission control process shown in FIG. 18, instead of prohibiting the execution of the above-mentioned program for transmission processing, or in addition to it, the switch device SW1 (or the switch device SW2) may be turned off.

Seventh Preferred Embodiment

In a memory reloading system of a seventh preferred embodiment, the ECU thereof differs from the ECU 62 of the sixth preferred embodiment described above in points (1) and (2) below. In this seventh preferred embodiment, parts which are the same as parts in the sixth preferred embodiment have been given the same reference numerals and will not be described in detail in the following.

Figure 19:
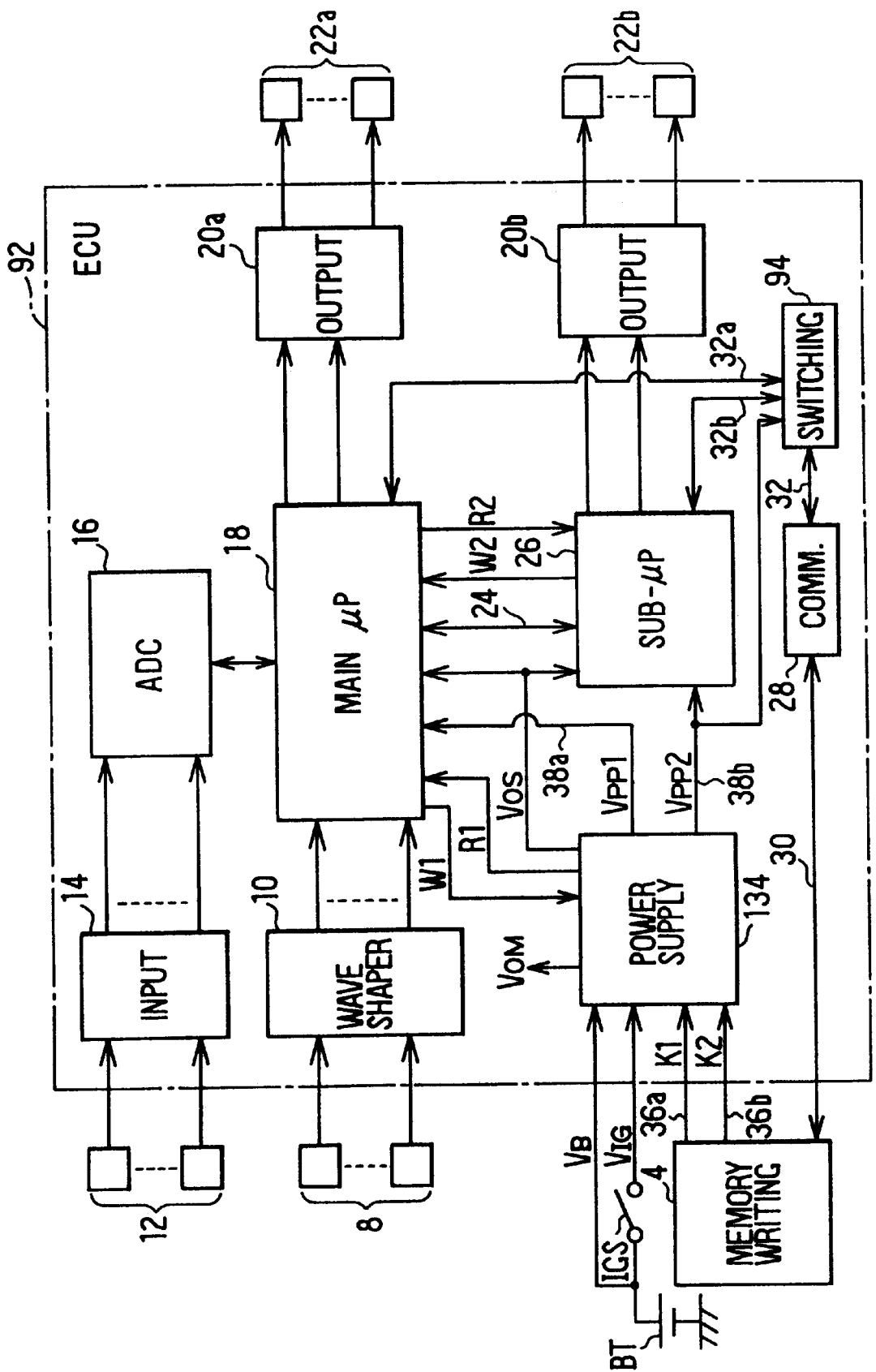
FIG. 19 is a block diagram showing the overall construction of a memory reloading system of an electronic control unit of a seventh preferred embodiment of the invention.

(1) First, as shown in FIG. 19, the ECU 92 of this seventh preferred embodiment does not have the monitor lines 39a, 39b of the second preferred embodiment. Also, the microprocessors 18, 26 do not execute the transmission control process shown in FIG. 18.

(2) Instead, as shown in FIG. 19, the ECU 92 of the seventh preferred embodiment has a switching circuit 94 serving as communication operation controlling means and selectively exclusively connecting one or the other of the microprocessors 18, 26 to the serial communication line 32 according to the voltage level of the power supply line 38 running from the power supply circuit 134 to the sub-microprocessor 26.

That is, if the voltage level of the power supply line 38b is lower than a predetermined value (for example, 5 V) equal to or lower than the loading voltage, the switching circuit 94 connects the main microprocessor 18 with the serial communication line 32 and, on the other hand, when the voltage level of the power supply line 38b is higher than the above-mentioned predetermined value, the switching circuit 94 connects the sub-microprocessor 26 to the serial communication line 32, and by means of this operation, the microprocessor to which the loading voltage is being supplied is specified and that specified microprocessor only is connected to the serial communication line 32.

With this ECU 92 of the seventh preferred embodiment, when the main microprocessor 18 executes a loading process for data reloading, because the voltage level of the power supply line 38b is below the above-mentioned predetermined value, the serial communication line 32 is connected to the main microprocessor 18 only, and when the sub-microprocessor 26 executes a loading process for data reloading, because the voltage level of the power supply line 38b is higher than the above-mentioned predetermined value, the sub-microprocessor 26 only is connected to the serial communication line 32.

Therefore, with the ECU 92 of this seventh preferred embodiment also, when either of the microprocessors 18, 26 is executing a loading process for data reloading, the other microprocessor is prohibited from transmitting data to the serial communication line 32 and as a result it is possible to certainly reload a control program and control data stored in the flash memory 42 of either of the microprocessors 18, 26 notwithstanding the use of a simple construction wherein the two microprocessors 18, 26 commonly use a single serial communication line 30, 32.

Furthermore, with the ECU 92 of this seventh preferred embodiment also, because it is not necessary for identification codes to be prestored in the microprocessors 18, 26, exactly as in the ECU 62 of the sixth preferred embodiment the manufacturability of the ECU 92 can be increased.

Other Embodiments

Although the ECUs 2, 62 and 92 of the first through seventh preferred embodiments described above all have two microprocessors 18, 26, they can be similarly constructed even if the number of microprocessors is three or more.

Also, although in the first through seventh preferred embodiments described above each of the microprocessors 18, 26 has a flash memory (flash EEPROM) 42 as a nonvolatile memory electrically reloadable with data, this may alternatively be an EEPROM or other memory.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. An electronic control unit comprising:
a microprocessor, having a nonvolatile memory electrically reloadable with data with a predetermined loading voltage being supplied as a condition, for controlling an object of control during normal operation by executing a control program made up of data stored in the nonvolatile memory and, when a predetermined reloading condition has been established, for carrying out a loading process for loading load data transmitted thereto from outside into the nonvolatile memory as an update and, along with executing the control program, generating at intervals of a predetermined time a monitor signal indicating that it is normal;
a system monitoring circuit for monitoring the monitor signal outputted from the microprocessor and, when the monitor signal is not outputted within a time set longer than said predetermined time, outputting to the microprocessor a reset signal for resetting the microprocessor; and
a blocking circuit for detecting whether the loading voltage is being supplied to the nonvolatile memory and preventing the microprocessor from being reset by the system monitoring circuit when the loading voltage is being supplied.

2. An electronic control unit according to claim 1, wherein the system monitoring circuit and the blocking circuit are integral as a power supply circuit.

3. An electronic control unit comprising:
a first microprocessor, having a nonvolatile memory electrically reloadable with data, for controlling an object of control during normal operation by executing a first control program made up of data stored in the nonvolatile memory, and for, when a predetermined reloading condition has been established, carrying out a loading process for loading load data transmitted thereto from outside into the nonvolatile memory as an update;
a second microprocessor, having a nonvolatile memory electrically reloadable with data, for controlling an object of control during normal operation by executing a second control program made up of data stored in the nonvolatile memory and for, when a predetermined reloading condition has been established, carrying out a loading process for loading load data transmitted thereto from outside into the nonvolatile memory as an update;

wherein the first microprocessor is for, as it executes the first control program, monitoring whether the second control program is being executed correctly by the second microprocessor and, when determining that a failure has occurred in the execution of the second control program, performing an operation to reset the second microprocessor;

said electronic control unit further comprises monitoring operation blocking means for preventing the second microprocessor from being reset by the operation of the first microprocessor while the second microprocessor is carrying out the loading process;

the second microprocessor is for carrying out the loading process with at least a predetermined loading voltage being supplied thereto as a condition; and the monitoring operation blocking means is for detecting whether the loading voltage is being supplied to the second microprocessor, and when the loading voltage is being supplied, preventing the second microprocessor from being reset by the operation of the first microprocessor.

4. An electronic control unit comprising:

a first microprocessor, having a nonvolatile memory electrically reloadable with data, for controlling an object of control during normal operation by executing a first control program made up of data stored in the nonvolatile memory and for, when a predetermined reloading condition has been established, carrying out a loading process for loading load data transmitted form outside into the nonvolatile memory as an update;

a second microprocessor, having a nonvolatile memory electrically reloadable with data, for controlling an object of control during normal operation by executing a second control program made up of data stored in the nonvolatile memory and for, when a predetermined reloading condition has been established, carrying out a loading process for loading load data transmitted from outside into the nonvolatile memory as an update;

wherein the first microprocessor is for, as it executes the first control program, outputting a monitor signal indicating that it is normal at intervals of a predetermined time and monitoring whether the second control program is being executed normally by the second microprocessor, and for, when determining that a failure has occurred in the execution of the second control program, stopping the outputting of the monitor signal;

the electronic control unit further comprises system monitoring means for monitoring the monitor signal outputted from the first microprocessor, and when the monitor signal is not outputted within a time set longer than said predetermined time, outputting to both of the microprocessors a reset signal for resetting both of the microprocessors, and blocking means for preventing at least one of the microprocessors from being reset by the system monitoring means while either of the microprocessors is carrying out the loading process;

each of the microprocessors is for carrying out the loading process with at least a predetermined loading voltage being supplied as a condition; and the blocking means is for detecting whether or not the loading voltage is being supplied to either of the microprocessors, and when the loading voltage is being supplied to either of the microprocessors, preventing at least one of the microprocessors from being reset by the system monitoring means.

5. An electronic control unit according to claim 4, wherein:

the system monitoring means includes a counter for performing a counting operation at intervals of a fixed period and has its count value initialized by the monitor signal outputted from the first microprocessor, and reset signal outputting means for outputting the reset signal to both of the microprocessors when the count value of the counter reaches a predetermined value;

the first microprocessor, as it executes the first control program, is for outputting the monitor signal to the counter at intervals of a period shorter than the time taken for the count value of the counter to reach said predetermined value after being initialized; and the blocking means is for preventing either of the computers from being reset by forcibly stopping the counting operation of the counters.

6. An electronic control unit comprising:

a first microprocessor, having a nonvolatile memory electrically reloadable with data, for controlling an object of control during normal operation by executing a first control program made up of data stored in the nonvolatile memory, and for, when a predetermined reloading condition has been established, carrying out a loading process for loading load data transmitted thereto from outside into the nonvolatile memory as an update;

a second microprocessor, having a nonvolatile memory electrically reloadable with data, for controlling an object of control during normal operation by executing a second control program made up of data stored in the nonvolatile memory and for, when predetermined reloading condition has been established, carrying out a loading process for loading load data transmitted thereto from outside into the nonvolatile memory as an update;

wherein the first microprocessor is for, as it executes the first control program, monitoring whether the second control program is being executed correctly by the second microprocessor and, when determining that a failure has occurred in the execution of the second control program, performing an operation to reset the second microprocessor;

said electronic control unit further comprises monitoring operation blocking means for preventing the second microprocessor from being reset by the operation of the first microprocessor while the second microprocessor is carrying out the loading process;

each of the microprocessors is for carrying out the loading process with at least a predetermined loading voltage being supplied as a condition; and the blocking means is for detecting whether or not the loading voltage is being supplied to either of the microprocessors, and when the loading voltage is being supplied to either of the microprocessors, preventing at least one of the microprocessors from being reset by the system monitoring means.

7. An electronic control unit comprising:

a first microprocessor, having a nonvolatile memory electrically reloadable with data, for controlling an object of control during normal operation by executing a first control program made up of data stored in the nonvolatile memory and for, when a predetermined reloading condition has been established, carrying out a loading process for loading load data transmitted form outside into the nonvolatile memory as an update;

a second microprocessor, having a nonvolatile memory electrically reloadable with data, for controlling an object of control during normal operation by executing a second control program made up of data stored in the nonvolatile memory and for, when a predetermined reloading condition has been established, carrying out a loading process for loading load data transmitted from outside into the nonvolatile memory as an update;

wherein the first microprocessor is for, as it executes the first control program, outputting a monitor signal indicating that it is normal at intervals of a predetermined time and monitoring whether the second control program is being executed normally by the second microprocessor, and for, when determining that a failure has occurred in the execution of the second control program, stopping the outputting of the monitor signal;

the electronic control unit further comprises
system monitoring means for monitoring the monitor signal outputted from the first microprocessor, and when the monitor signal is not outputted within a time set longer than said predetermined time, outputting to both of the microprocessors a reset signal for resetting both of the microprocessors, and blocking means for preventing at least one of the microprocessors from being reset by the system monitoring means while either of the microprocessors is carrying out the loading process;

the second microprocessor is for carrying out the loading process with at least a predetermined loading voltage being supplied thereto as a condition; and the monitoring operation blocking means is for detecting whether the loading voltage is being supplied to the second microprocessor, and when the loading voltage is being supplied, preventing the second microprocessor from being reset by the operation of the first microprocessor.

8. An electronic control unit comprising:

a first microprocessor, having a nonvolatile memory electrically reloadable with data, for controlling an object of control during normal operation by executing a first control program made up of data stored in the nonvolatile memory and for, when a predetermined reloading condition has been established, carrying out a loading process for loading load data transmitted form outside into the nonvolatile memory as an update;

a second microprocessor, having a nonvolatile memory electrically reloadable with data, for controlling an object of control during normal operation by executing a second control program made up of data stored in the nonvolatile memory and for, when a predetermined reloading condition has been established, carrying out a loading process for loading load data transmitted from outside into the nonvolatile memory as an update;

wherein the first microprocessor is for, as it executes the first control program, outputting a monitor signal indicating that it is normal at intervals of a predetermined time and monitoring whether the second control program is being executed normally by the second microprocessor, and for, when determining that a failure has occurred in the execution of the second control program, stopping the outputting of the monitor signal;

the electronic control unit further comprises
system monitoring means for monitoring the monitor signal outputted from the first microprocessor, and when the monitor signal is not outputted within a time set longer than said predetermined time, outputting to both of the microprocessors a reset signal for resetting both of the microprocessors, and blocking means for preventing at least one of the microprocessors from being reset by the system monitoring means while either of the microprocessors is carrying out the loading process;

the system monitoring means includes
a counter for performing a counting operation at intervals of a fixed period and has its count value initialized by the monitor signal outputted from the first microprocessor, and reset signal outputting means for outputting the reset signal to both of the microprocessors when the count value of the counter reaches a predetermined value;

the first microprocessor, as it executes the first control program, is for outputting the monitor signal to the counter at intervals of a period shorter than the time taken for the count value of the counter to reach said predetermined value after being initialized; and the blocking means is for preventing either of the computers from being reset by forcibly stopping the counting operation of the counter.

9. An electronic control unit comprising:

a first microprocessor, having a nonvolatile memory electrically reloadable with data, for controlling an object of control during normal operation by executing a first control program made up of data stored in the nonvolatile memory and for, when a predetermined reloading condition has been established, carrying out a loading process for loading load data transmitted from outside into the nonvolatile memory as an update;

a second microprocessor, having a nonvolatile memory electrically reloadable with data, for controlling an object of control during normal operation by executing a second control program made up of data stored in the nonvolatile memory and for, when a predetermined reloading condition has been established, carrying out a loading process for loading load data transmitted from outside into the nonvolatile memory as an update;

wherein the first microprocessor is for, as it executes the first control program, outputting a monitor signal indicating that it is normal at intervals of a predetermined time and monitoring whether the second control program is being executed normally by the second microprocessor, and for, when determining that a failure has occurred in the execution of the second control program, stopping the outputting of the monitor signal;

the electronic control unit further comprises
system monitoring means for monitoring the monitor signal outputted from the first microprocessor, and when the monitor signal is not outputted within a time set longer than said predetermined time, outputting to both of the microprocessors a reset signal for resetting both of the microprocessors, and blocking means for preventing at least one of the microprocessors from being reset by the system monitoring means while either of the microprocessors is carrying out the loading process;

the system monitoring means includes
a counter for performing a counting operation at intervals of a fixed period, and reset signal outputting means for outputting the reset signal to both of the microprocessors when the count value of the counter reaches a predetermined value; and the blocking means is for preventing either of the computers from being reset by forcibly stopping the counting operation of the counter.

10. An electronic control unit according to claim 9, wherein:
- the first microprocessor outputs a reset signal to the second microprocessor when it determines that a failure has occurred in the execution of the second control program, the reset signal being for resetting the second microprocessor; and
- said monitoring operation blocking means prevents the reset signal from being input to the second microprocessor to prevent the second microprocessor from being reset.

11. An electronic control unit according to claim 9, wherein data constituting the first control program is loaded into the nonvolatile memory of the first microprocessor before data constituting the second control program is loaded into the nonvolatile memory of the second microprocessor.

12. An electronic control unit according to claim 9, wherein the blocking means prevents the reset signal outputted from the system monitoring means from being input into either of the microprocessors to prevent either of the microprocessors from being reset.

13. An electronic control unit comprising:
- a first microprocessor having a nonvolatile memory, for controlling an object of control during normal operation by executing a first control program made up of data stored in the nonvolatile memory;
- a second microprocessor having a nonvolatile memory, for controlling an object of control during normal operation by executing a second control program made up of data stored in the nonvolatile memory;
- wherein the first microprocessor is for, as it executes the first control program, outputting a monitor signal indicating that it is normal at intervals of a predetermined time and monitoring whether the second control program is being executed normally by the second microprocessor, and for, when determining that a failure has occurred in the execution of the second control program, stopping the outputting of the monitor signal;
- the electronic control unit further comprises system monitoring means for monitoring the monitor signal outputted from the first microprocessor, and when the monitor signal is not outputted within a time set longer than said predetermined time, outputting to both of the microprocessors a reset signal for resetting both of the microprocessors; and
- the nonvolatile memory of at least one of the first microcomputer and the second microcomputer is capable of being electrically reloaded with data, said at least one of the first microcomputer and the second microcomputer having the electrically reloadable nonvolatile memory controls an object of control during normal operation by executing a control program made up of data stored in the nonvolatile memory and, when a predetermined reloading condition has been established, carries out a loading process for loading load data transmitted from outside into the nonvolatile memory as an update;
- the electronic control unit further comprises blocking means for preventing at least one of the first microcomputer and the second microcomputer having the electrically reloadable nonvolatile memory from being reset by the system monitoring means while either of the microprocessors is carrying out the loading process;
- the system monitoring means includes
    - a counter for performing a counting operation at intervals of a fixed period, and
    - reset signal outputting means for outputting the reset signal to both of the microprocessors when the count value of the counter reaches a predetermined value; and
- the blocking means is for preventing either of the computers from being reset by forcibly stopping the counting operation of the counter.

14. An electronic control unit according to claim 13, where:
- the first microprocessor outputs a reset signal to the second microprocessor when it determines that a failure has occurred in the execution of the second control program, the reset signal being for resetting the second microprocessor; and
- said monitoring operation blocking means prevents the reset signal from being input to the second microprocessor to prevent the second microprocessor from being reset.

15. An electronic control unit according to claim 13, wherein data constituting the first control program is loaded into the nonvolatile memory of the first microprocessor before data constituting the second control program is loaded into the nonvolatile memory of the second microprocessor.

16. An electronic control unit according to claim 13, wherein the blocking means prevents the reset signal outputted from the system monitoring means from being input into either of the microprocessors to prevent either of the microprocessors from being reset.

* * * * *